(12) United States Patent
Taugerbeck et al.

(10) Patent No.: US 7,270,856 B2
(45) Date of Patent: Sep. 18, 2007

(54) CYCLOBUTANE DERIVATIVES

(75) Inventors: Andreas Taugerbeck, Darmstadt (DE); Michael Heckmeier, Hemsbach (DE); Peer Kirsch, Kanagawa (JP); Georg Luessem, Petershausen (DE); Eike Poetsch, Muehltal (DE)

(73) Assignee: Merck Patent GmbH, Darmstadt (DE)

( * ) Notice: Subject to any disclaimer, the term of this patent is extended or adjusted under 35 U.S.C. 154(b) by 110 days.

(21) Appl. No.: 10/537,026

(22) PCT Filed: Nov. 5, 2003

(86) PCT No.: PCT/EP03/12511

§ 371 (c)(1),
(2), (4) Date: Jun. 1, 2005

(87) PCT Pub. No.: WO2004/050796

PCT Pub. Date: Jun. 17, 2004

(65) Prior Publication Data

US 2006/0022168 A1    Feb. 2, 2006

(30) Foreign Application Priority Data

Dec. 2, 2002    (DE) .................. 102 56 172

(51) Int. Cl.
*C09K 19/30* (2006.01)
*C09K 19/34* (2006.01)
*C09K 19/32* (2006.01)
*C07D 319/06* (2006.01)
*C07D 309/02* (2006.01)
*C07C 43/192* (2006.01)
*C07C 25/13* (2006.01)

(52) U.S. Cl. ............. 428/1.1; 252/299.01; 252/299.61; 252/299.62; 252/299.63; 252/299.66; 549/428; 549/380; 570/127; 570/129; 570/130; 570/131; 570/132; 570/183; 570/187

(58) Field of Classification Search ................ 428/1.1; 252/299.01, 299.61, 299.62, 299.63, 299.66, 252/299.67; 549/369, 428; 570/127, 129, 570/130, 131, 132, 183, 188
See application file for complete search history.

(56) References Cited

U.S. PATENT DOCUMENTS

| 4,853,151 A | 8/1989 | Voegtle et al. |
| 5,445,764 A | 8/1995 | Poetsch et al. |
| 6,146,719 A | 11/2000 | Poetsch et al. |
| 6,716,491 B2* | 4/2004 | Tarumi et al. ............... 428/1.1 |
| 2002/0030180 A1 | 3/2002 | Tarumi et al. |
| 2003/0230737 A1 | 12/2003 | Kirsch et al. |

FOREIGN PATENT DOCUMENTS

| DE | 4303634 | 8/1994 |
| DE | 4408418 | 9/1995 |
| DE | 3717484 | 12/1998 |
| DE | 19755245 | 6/1999 |
| JP | 11080049 | 3/1999 |
| WO | WO 0248073 | 6/2002 |

OTHER PUBLICATIONS

Patent Abstracts of Japan vol. 1999, No. 08, Jun. 30, 1999.

* cited by examiner

*Primary Examiner*—Shean C Wu
(74) *Attorney, Agent, or Firm*—Millen, White, Zelano & Branigan, P.C.

(57) ABSTRACT

The invention relates to novel cyclobutane derivatives of the formula (I), in which $R^1$, $R^2$, A, Z, m, n and o have the meaning indicated in claim 1, to the use thereof as components of liquid-crystalline media, and to liquid-crystal and electro-optical display elements which contain the liquid-crystalline media according to the invention

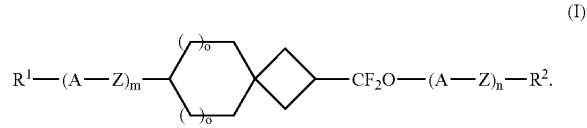

11 Claims, No Drawings

CYCLOBUTANE DERIVATIVES

The present invention relates to cyclobutane derivatives which contain both a $CF_2O$ bridge as constituent of their mesogenic skeleton and a butane-1,4-diyl group as part of a spiroalkane unit, to the use thereof as component(s) of liquid-crystalline media, and to liquid-crystal and electro-optical display elements which contain these liquid-crystalline media according to the invention.

The cyclobutane derivatives according to the invention can be used as components of liquid-crystalline media, in particular for displays based on the principle of the twisted cell, the guest-host effect, the effect of deformation of aligned phases DAP or ECB (electrically controlled birefringence), the IPS effect (in-plane switching) or the effect of dynamic scattering.

All the substances employed hitherto for this purpose have certain disadvantages, for example inadequate stability to the effect of heat, light or electric fields, or unfavourable elastic and/or dielectric properties.

The invention thus had the object of finding novel stable liquid-crystalline or mesogenic compounds which are suitable as components of liquid-crystalline media, in particular for TN, STN, IPS and TFT displays.

A further object of the present invention was to provide liquid-crystalline compounds which have low rotational viscosity, result in an improvement in low-temperature stability in liquid-crystal mixtures, and can be synthesised simply. In particular through the reduction in the rotational viscosity, it should be possible to achieve significantly shorter response times.

Surprisingly, it has been found that the cyclobutane derivatives according to the invention are eminently suitable as components of liquid-crystalline media. They can be used to obtain stable liquid-crystalline media, particularly suitable for TFT or STN displays.

The physical properties of the cyclobutane derivatives according to the invention can be varied in broad ranges through a suitable choice of the ring members and/or the terminal substituents. Thus, for example, it is possible to obtain cyclobutane derivatives according to the invention having very low optical anisotropy values or low positive to highly positive dielectric anisotropy values.

In particular, the cyclobutane derivatives according to the invention are distinguished by high clearing points at the same time as unexpectedly low rotational viscosity.

Liquid-crystalline media having very low optical anisotropy values are of particular importance for reflective and transflective applications, i.e. applications in which the respective LCD experiences no or only supporting backlighting.

The provision of the cyclobutane derivatives according to the invention very generally considerably broadens the range of liquid-crystalline substances which are suitable, from various applicational points of view, for the preparation of liquid-crystalline mixtures.

The cyclobutane derivatives according to the invention have a broad range of applications. Depending on the choice of the substituents, these compounds can serve as base materials of which liquid-crystalline media are predominantly composed; however, it is also possible to add liquid-crystalline base materials from other classes of compound to the cyclo-butane derivatives according to the invention in order, for example, to influence the dielectric and/or optical anisotropy of a dielectric of this type and/or to optimise its threshold voltage and/or its viscosity.

In the pure state, the cyclobutane derivatives according to the invention are colourless and form liquid-crystalline mesophases in a temperature range which is favourably located for electro-optical use. They are stable chemically, thermally and to light.

The present invention thus relates to cyclobutane derivatives of the formula I

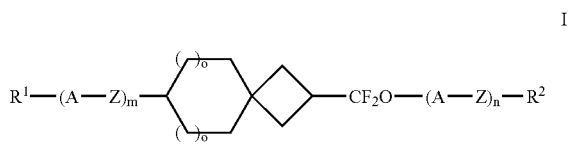

in which $R^1$, $R^2$ are identical or different and each, independently of one another, denote H, halogen (F, Cl, Br or I) or a linear or branched, optionally chiral alkyl or alkoxy radical having 1 to 15 C atoms which is unsubstituted or mono- or polysubstituted by halogen and in which one or more $CH_2$ groups may each be replaced, independently of one another, by —O—, —S—, —CO—, —CO—O—, —O—CO—, —O—CO—O—, —CH=CH—, —CH=CF—, —CF=CF—, —C≡C— or

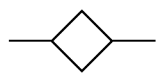

in such a way that heteroatoms are not linked directly to one another, —CN, —SCN, —NCS, —SF$_5$, —SCF$_3$, —CF$_3$, —CF=CF$_2$, —CF$_2$CF$_2$CF$_3$, —OCF$_3$, —OCHF$_2$, —CF$_2$CH$_2$CF$_3$ or —OCH$_2$CF$_2$CHFCF$_3$, A is identical or different and in each case, independently of one another, denotes
  a) trans-1,4-cyclohexylene, in which, in addition, one or more non-adjacent $CH_2$ groups may be replaced by —O— and/or —S— and in which, in addition, one or more H atoms may be replaced by F,
  b) 1,4-phenylene, in which one or two CH groups may be replaced by N and in which, in addition, one or more H atoms may be replaced by halogen (F, Cl, Br or I), —CN, —CH$_3$, —CHF$_2$, —CH$_2$F, —OCH$_3$, —OCHF$_2$ or —OCF$_3$,
  c) a radical from the group bicyclo[1.1.1]pentane-1,3-diyl, bicyclo[2.2.2]octane-1,4-diyl, spiro[3.3]heptane-2,6-diyl, naphthalene-2,6-diyl, decahydronaphthalene-2,6-diyl, 1,2,3,4-tetrahydronaphthalene-2,6-diyl and piperidine-1,4-diyl, or
  d) 1,4-cyclohexenylene, Z is identical or different and in each case, independently of one another, denotes —O—, —CH$_2$O—, —OCH$_2$—, —CO—O—, —O—CO—, —CF$_2$O—, —OCF$_2$—, —CF$_2$CF$_2$—, —CH$_2$CF$_2$—, —CF$_2$CH$_2$—, —CH$_2$CH$_2$—, —CH=CH—, —CH=CF—, —CF=CH—, —CF=CF—, —CF=CF—COO—, —O—CO—CF=CF—, —C≡C— or a single bond, m, n are identical or different and, independently of one another, denote 0, 1 or 2, preferably m=0 or 1 and n=1 or 2, and o denotes 0 or 1.

The present invention furthermore relates to the use of compounds of the formula I as component(s) of liquid-crystalline media.

The present invention likewise relates to liquid-crystalline media having at least two liquid-crystalline components which comprise at least one compound of the formula 1.

The present invention also relates to liquid-crystal display elements, in particular electro-optical display elements, which contain, as dielectric, a liquid-crystalline medium according to the invention.

Particular preference is given to reflective and transflective liquid-crystal display elements and other liquid-crystal displays of low birefringence Δn, so-called "low Δn mode displays", such as, for example, reflective and transflective TN displays.

The meaning of the formula I includes all isotopes of the chemical elements bound in the compounds of the formula I. In enantiomerically pure or enriched form, the compounds of the formula I are also suitable as chiral dopants and in general for achieving chiral mesophases.

Above and below, $R^1$, $R^2$, A, Z, m, n and o have the meaning indicated, unless expressly stated otherwise. If the radicals A and Z occur more than once, they may, independently of one another, adopt identical or different meanings.

Preference is given to compounds of the formula I in which $R^1$ is H or a linear alkyl radical having 1 to 10 C atoms.

Preference is likewise given to compounds of the formula I in which $R^2$ denotes H, a linear alkoxy radical having 1 to 10 C atoms, —F, —Cl, —CF$_3$, —OCF$_3$, —OCHF$_2$, —CN, —NCS or —SF$_5$, particularly preferably —OC$_2$H$_5$, —F, —CF$_3$, —OCF$_3$ or —CN.

Preferred compounds of the formula I are compounds of the sub-formula Ia

Ia and compounds of the sub-formula Ib

Ib in which $R^1$, $R^2$, A, Z, m and n have the meanings indicated above.

Z preferably denotes —CH$_2$CH$_2$—, —CH=CH—, —C≡C—, —CF$_2$CF$_2$—, —CF=CF—, —CF$_2$O— or a single bond, particularly preferably a single bond.

For reasons of simplicity, Cyc below denotes a 1,4-cyclohexylene radical, Che denotes a 1,4-cyclohexenylene radical, Dio denotes a 1,3-dioxane-2,5-diyl radical, Dit denotes a 1,3-dithiane-2,5-diyl radical, Phe denotes a 1,4-phenylene radical, Pyd denotes a pyridine-2,5-diyl radical, Pyr denotes a pyrimidine-2,5-diyl radical, Bco denotes a bicyclo[2.2.2]octylene radical and Dec denotes a decahydronaphthalene-2,6-diyl radical, where Cyc and/or Phe may be unsubstituted or mono- or polysubstituted by CH$_3$, Cl, F or CN.

A preferably denotes Phe, Cyc, Che, Pyd, Pyr or Dio, and particularly preferably Phe or Cyc.

Phe preferably denotes

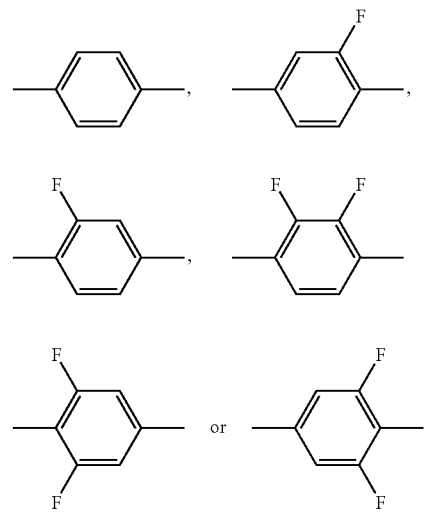

The terms 1,3-dioxane-2,5-diyl and Dio each encompass the two positional isomers

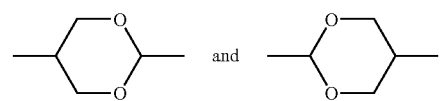

The cyclohexene-1,4-diyl group preferably has the following structures:

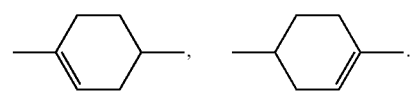

Particularly preferred compounds of the formula Ia include the following formulae:

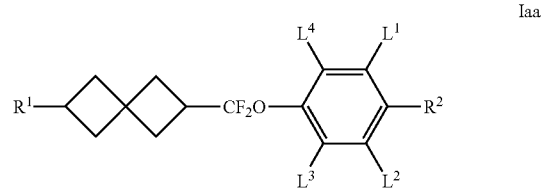

Iaa

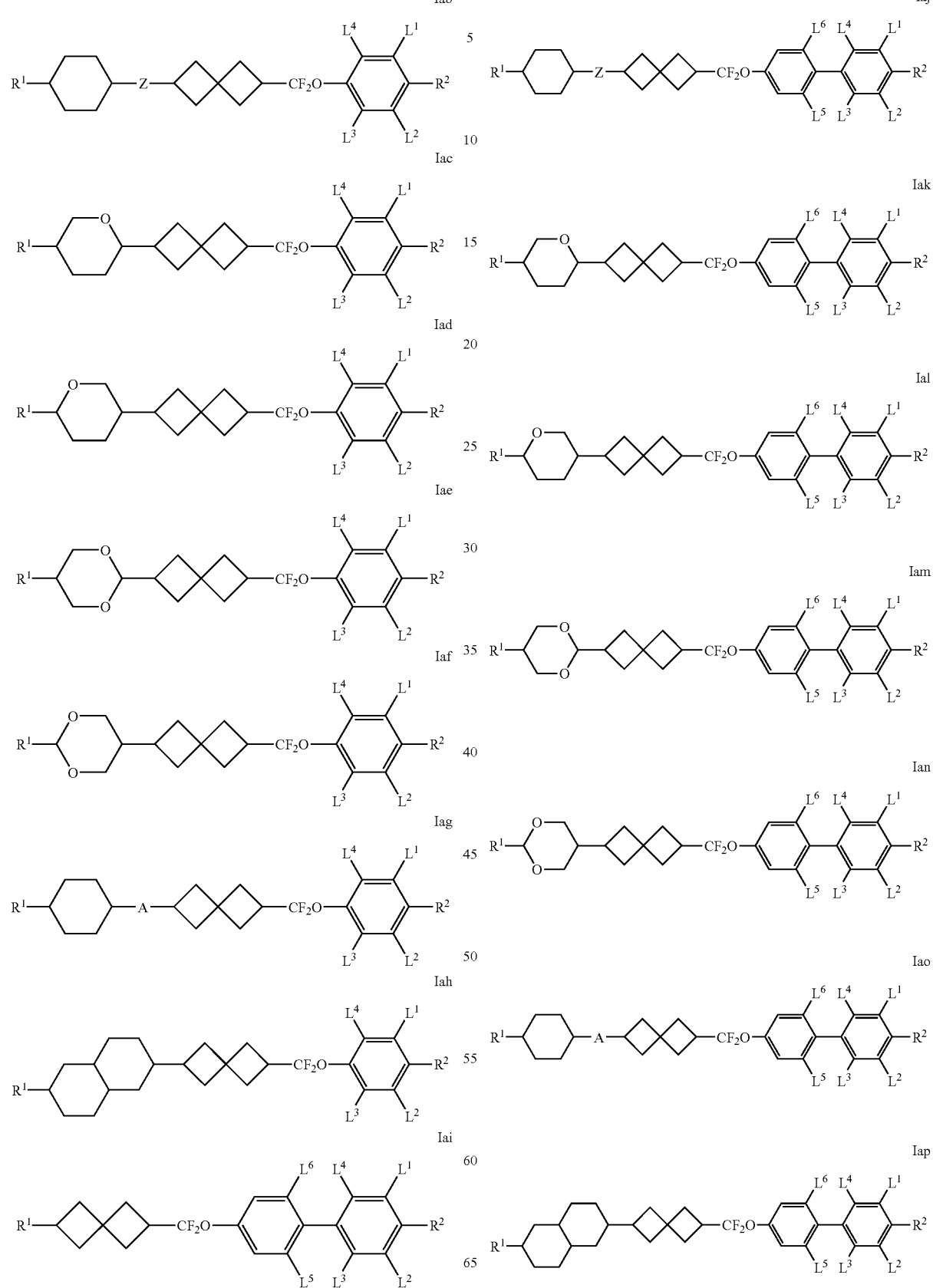

Particularly preferred compounds of the formula Ib include the following formulae:
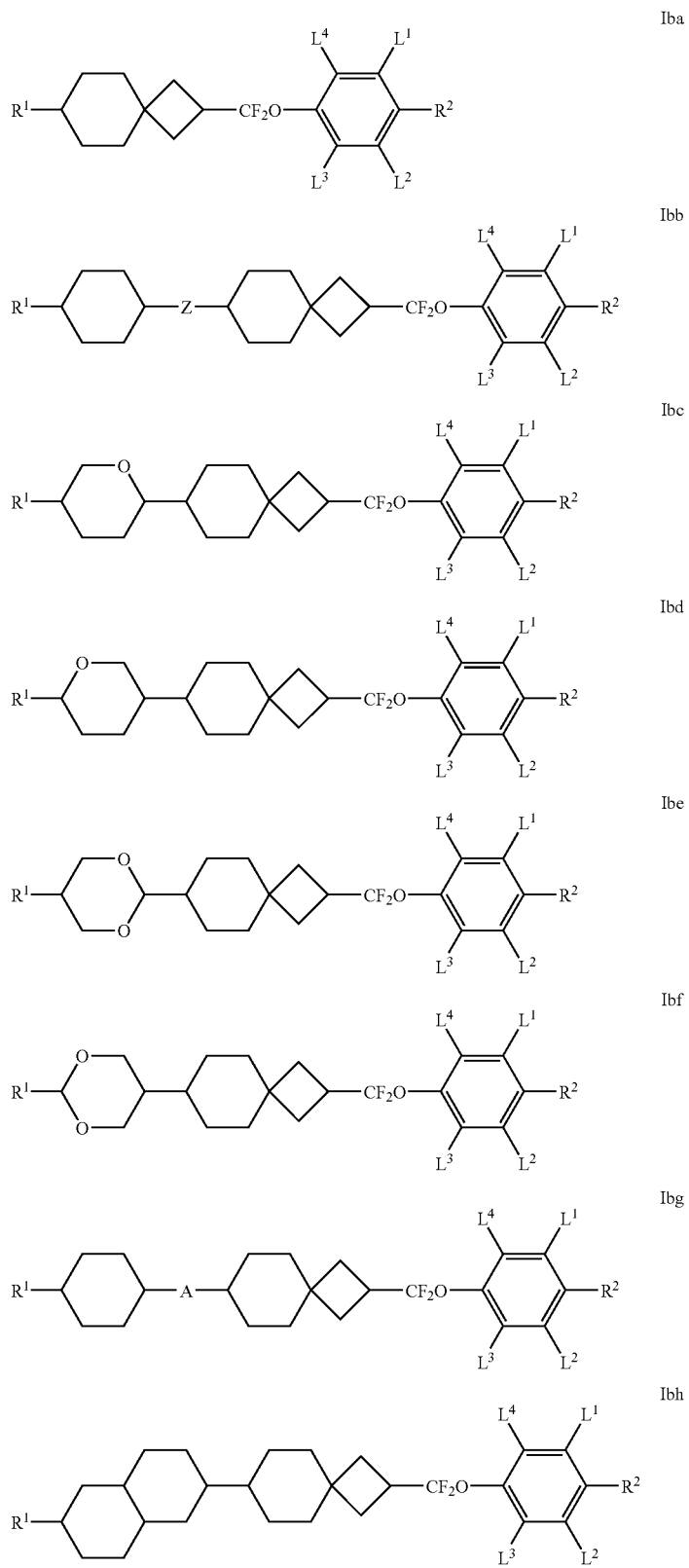

-continued

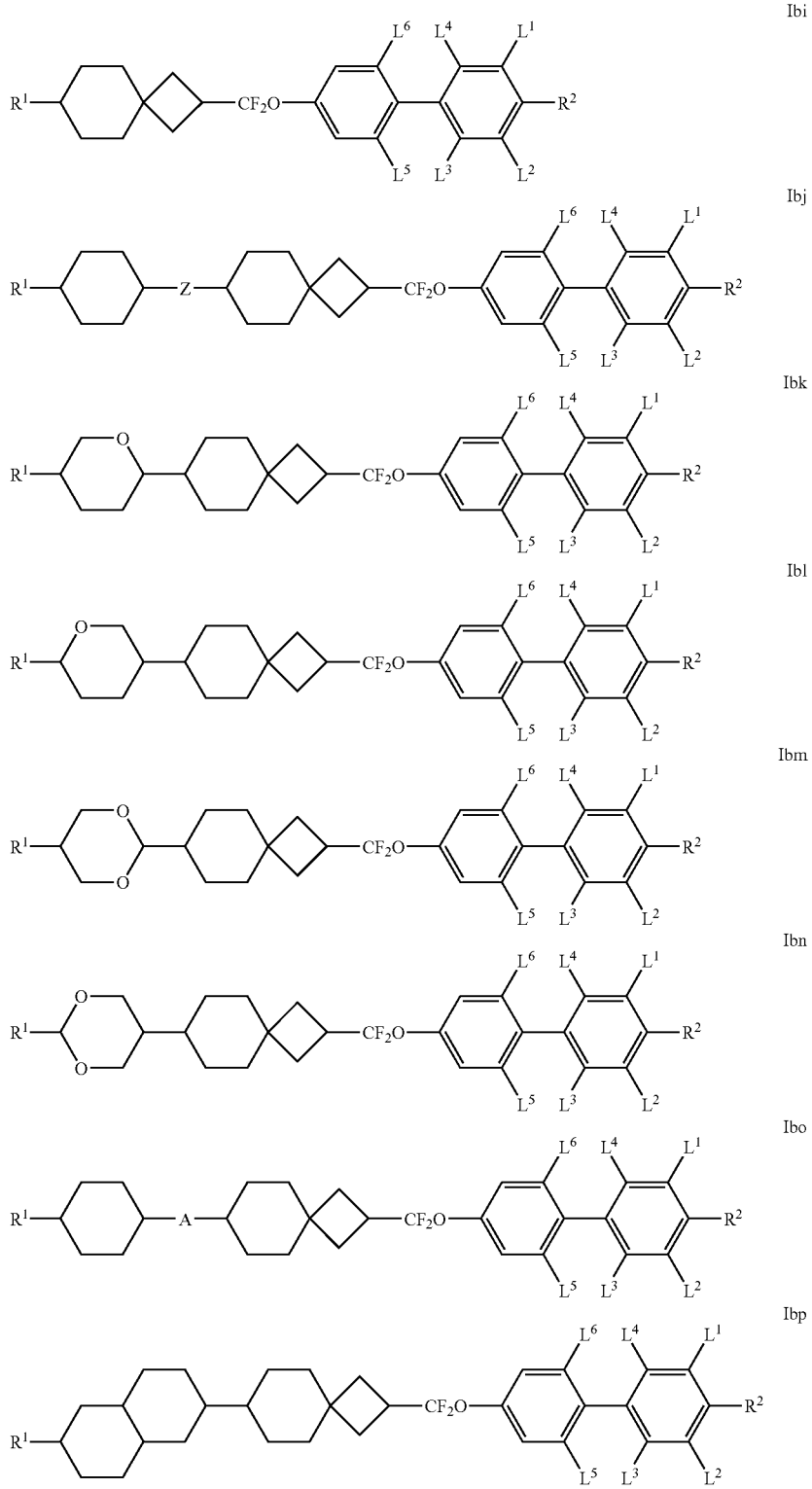

in which $R^1$, $R^2$, A and Z have the meanings indicated above, and $L^1$, $L^2$, $L^3$, $L^4$, $L^5$ and $L^6$, are identical or different and, independently of one another, denote H or F.

Preference is given to compounds of the formulae Iaa to Iap and Iba to Ibp in which $R^1$ denotes H or a linear alkyl or alkoxy radical having 1 to 10 C atoms or alkenyl or alkenyloxy having 2 to 10 C atoms.

Preference is likewise given to compounds of the formulae Iaa to Iap and Iba to Ibp in which $R^2$ denotes —F, —$CF_3$, —$OCF_3$, —CN, —NCS, —$SF_5$ or —$OC_2H_5$.

Particular preference is given to compounds of the formulae Iaa to Iah and Iba to Ibh in which $R^2$ denotes —F, —$CF_3$, —$OCF_3$, —CN, —NCS or —$SF_5$, $L^1$ and $L^2$, are identical or different and, independently of one another, denote F or H, and $L^3$ and $L^4$ denote H.

Particular preference is given to compounds of the formulae Iaa to Iah and Iba to Ibh in which $R^2$ is —$OC_2H_5$, $L^2$ and $L^3$, are identical or different and are, independently of one another, F or H, and $L^1$ and $L^4$ are H.

Particular preference is given to compounds of the formulae Iai to Iap and Ibi to Ibp in which $R^2$ denotes —F, —$CF_3$, —$OCF_3$, —CN, —NCS or —$SF_5$, $L^1$, $L^2$, $L^5$ and $L^6$, are identical or different and, independently of one another, denote F or H, and $L^3$ and $L^4$ denote H.

Particular preference is given to compounds of the formulae Iai to Iap and Ibi to Ibp in which $R^2$ denotes —$OC_2H_5$, $L^2$, $L^3$ and $L^6$, are identical or different and, independently of one another, denote F or H, and $L^1$, $L^4$ and $L^5$ denote H.

In the compounds of the formulae Iab, Iaj, Ibb and Ibj, Z preferably denotes —$CH_2CH_2$—, —$CF_2CF_2$—, —$CF_2O$— or a single bond, particularly preferably a single bond.

In the compounds of the formulae Iag, Iao, Ibg and Ibo, A is preferably

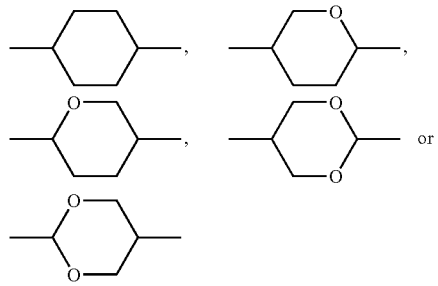

If $R^1$ and/or $R^2$ in the formulae above and below denote an alkyl radical, this may be straight-chain or branched. It is particularly preferably straight-chain, has 2, 3, 4, 5, 6 or 7 C atoms and accordingly denotes ethyl, propyl, butyl, pentyl, hexyl or heptyl, furthermore methyl, octyl, nonyl, decyl, undecyl, dodecyl, tridecyl, tetradecyl or pentadecyl.

If $R^1$ and/or $R^2$ denotes an alkyl radical in which one $CH_2$ group has been replaced by —O—, this may be straight-chain or branched. It is preferably straight-chain and has 1 to 10 C atoms. The first $CH_2$ group of this alkyl radical has particularly preferably been replaced by —O—, so that the radical $R^1$ and/or $R^2$ attains the meaning alkoxy and, in particular, denotes methoxy, ethoxy, propoxy, butoxy, pentyloxy, hexyloxy, heptyloxy, octyloxy or nonyloxy.

Furthermore, a $CH_2$ group elsewhere may also be replaced by —O—, so that the radical $R^1$ and/or $R^2$ preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If $R^1$ and/or $R^2$ denotes an alkyl radical in which one $CH_2$ group has been replaced by —CH=CH—, this may be straight-chain or branched. It is preferably straight-chain and has 2 to 10 C atoms. Accordingly, it denotes vinyl, prop-1- or -2-enyl, but-1-, -2- or -3-enyl, pent-1-, -2-, -3- or 4-enyl, hex-1-, -2-, -3-, -4- or -5-enyl, hept-1-, -2-, -3-, 4-, -5- or -6-enyl, oct-1-, -2-, -3-, 4-, -5-, -6- or -7-enyl, non-1-, -2-, -3-, -4-, -5-, -6-, -7- or -8-enyl, or dec-1-, -2-, -3-, 4-, -5-, -6-, -7-, -8- or -9-enyl.

Preferred alkenyl groups are $C_2$-$C_{71}$ E-alkenyl, $C_4$-$C_7$-3E-alkenyl, $C_5$-$C_7$-4-alkenyl, $C_6$-$C_7$-5-alkenyl and $C_7$-6-alkenyl, particularly preferably $C_2$-$C_7$-1E-alkenyl, $C_4$-$C_7$-3E-alkenyl and $C_5$-$C_7$-4-alkenyl.

Examples of particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. Groups having up to 5 carbon atoms are particularly preferred.

If $R^1$ and/or $R^2$ denotes an alkyl radical in which one $CH_2$ group has been replaced by —O— and one has been replaced by —CO—, these are preferably adjacent. These thus contain an acyloxy group —CO—O— or an oxycarbonyl group —O—CO—. These are particularly preferably straight-chain and have 2 to 6 C atoms.

Accordingly, they denote in particular acetoxy, propionyloxy, butyryloxy, pentanoyloxy, hexanoyloxy, acetoxymethyl, propionyloxymethyl, butyryS oxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^1$ and/or $R^2$ denotes an alkyl radical in which one $CH_2$ group has been replaced by unsubstituted or substituted —CH=CH— and an adjacent $CH_2$ group has been replaced by CO, CO—O or O—CO, this may be straight-chain or branched. It is preferably straight-chain and has 4 to 13 C atoms. Accordingly, it particularly preferably denotes acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ and/or $R^2$ denotes an alkyl or alkenyl radical which is monosubstituted by CN or $CF_3$, this radical is preferably straight-chain and substitution by CN or $CF_3$ is in the co-position.

If $R^1$ and/or $R^2$ denotes an alkyl radical which is at least monosubstituted by halogen, this radical is preferably straight-chain. Halogen is preferably F or Cl. In the case of polysubstitution, halogen is preferably F. The resultant radicals also include perfluorinated radicals. In the case of monosubstitution, the fluorine or chlorine substituent can be in any desired position, but is preferably in the co-position.

Compounds of the formula I having a branched wing group $R^1$ and/or $R^2$ may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals $R^1$ and/or $R^2$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentyloxy, 3-methylpentyloxy, 2-ethylhexyloxy, 1-methylhexyloxy and 1-methylheptyloxy.

The formula I encompasses both the racemates of these compounds and the optical antipodes, and mixtures thereof.

Of the compounds of the formula I and the sub-formulae, preference is given to those in which at least one of the radicals present therein has one of the preferred meanings indicated.

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can be made here of variants which are known per se, but are not mentioned here in greater detail.

The compounds of the formula I can be prepared, for example, in accordance with the following reaction schemes or analogously thereto. Further synthetic methods are given in the examples.

In schemes 1 to 4, $R^1$, $R^2$, A, Z, n, m and o have the meanings indicated above. $L^1$, $L^2$, $L^3$, $L^4$, $L^5$ and $L^6$, are identical or different and, independently of one another, denote H or F.

Scheme 1:

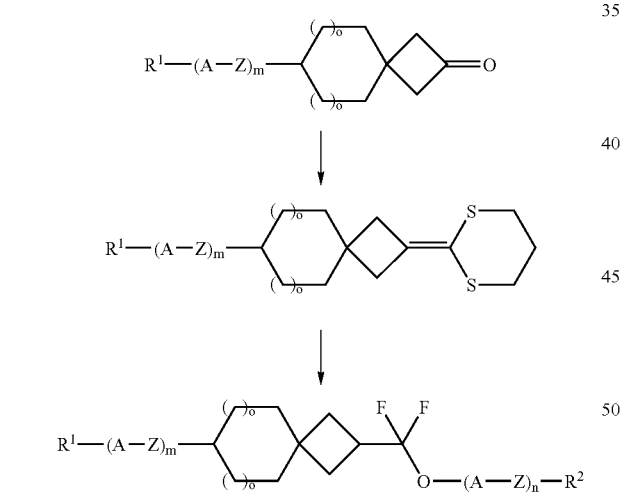

(o = 0 or 1)
Synthesis disclosed in WO 02/48073 A1.

Scheme 2:

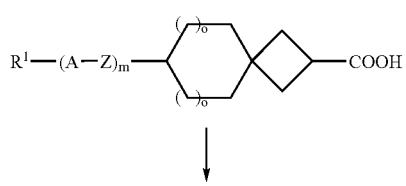

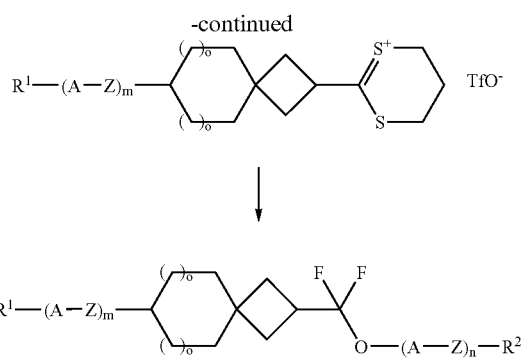

(o = 0 or 1)
Synthesis disclosed in WO 01/64667 A1, in P. Kirsch, M. Bremer, A. Taugerbeck, T. Wallmichrath, Angew. Chem. Int. Ed. Engl. 2001, 40, 1480-1484, and in the literature cited in this article.

Scheme 3:

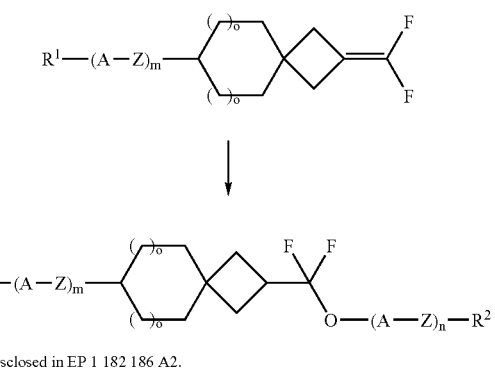

(o = 0 or 1)
Synthesis disclosed in EP 1 182 186 A2.

Scheme 4:

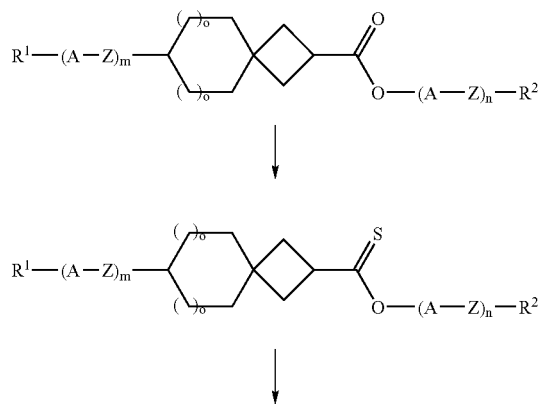

(o = 0 or 1)
Synthesis disclosed in EP 1 182 186 A2.

The starting materials are either known or can be prepared analogously to known compounds.

If desired, the starting materials can also be formed in situ by not isolating them from the reaction mixture, but instead immediately converting them further into the compounds of the formula I.

The liquid-crystalline media according to the invention preferably comprise 2 to 40, particularly preferably 4 to 30, components as further constituents besides one or more compounds according to the invention. In particular, these media comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-biscyclohexylbenzenes, 4,4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of the media according to the invention can be characterised by the formulae 1, 2, 3, 4 and 5:

R'-L-E-R"     1

R'-L-COO-E-R"     2

R'-L-OOC-E-R"     3

R'-L-CH$_2$CH$_2$-E-R"     4

R'-L-C≡C-E-R"     5

In the formulae 1, 2, 3, 4 and 5, L and E, which may be identical or different, each, independently of one another, denote a divalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe denotes unsubstituted or fluorine-substituted 1,4-phenylene, Cyc denotes trans-1,4-cyclohexylene or 1,4-cyclohexenylene, Pyr denotes pyrimidine-2,5-diyl or pyridine-2,5-diyl, Dio denotes 1,3-dioxane-2,5-diyl and G denotes 2-(trans-1,4-cyclohexyl)ethyl.

One of the radicals L and E preferably denotes Cyc, Phe or Pyr. E preferably denotes Cyc, Phe or Phe-Cyc. The media according to the invention preferably comprise one or more components selected from the compounds of the formulae 1, 2, 3, 4 and 5 in which L and E are selected from the group Cyc, Phe and Pyr and simultaneously one or more components selected from the compounds of the formulae 1, 2, 3, 4 and 5 in which one of the radicals L and E is selected from the group Cyc, Phe and Pyr and the other radical is selected from the group -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group -Phe-Cyc-, -Cyc-Cyc-, -G-Phe- and -G-Cyc-.

R' and/or R" each, independently of one another, denote alkyl, alkenyl, alkoxy, alkoxyalkyl, alkenyloxy or alkanoyloxy having up to 8 C atoms, —F, —Cl, —CN, —NCS, —(O)$_i$CH$_{3-(k+l)}$F$_k$Cl$_l$, where i denotes 0 or 1, k and l, are identical or different and, independently of one another, denote 0, 1, 2 or 3, and the following applies to the sum (k+l): $1 \leq (k+l) \leq 3$.

In a smaller sub-group of the compounds of the formulae 1, 2, 3, 4 and 5, R' and R" each, independently of one another, denote alkyl, alkenyl, alkoxy, alkoxyalkyl, alkenyloxy or alkanoyloxy having up to 8 C atoms. This smaller sub-group is called group A below, and the compounds are referred to by the sub-formulae 1a, 2a, 3a, 4a and 5a. In most of these compounds, R' and R" are different from one another, one of these radicals usually being alkyl, alkenyl, alkoxy or alkoxyalkyl.

In another smaller sub-group of the compounds of the formulae 1, 2, 3, 4 and 5, which is known as group B, R" is —F, —Cl, —NCS or —(O)$_i$CH$_{3-(k+l)}$F$_k$C$_l$, where i denotes 0 or 1, k and l, are identical or different and, independently of one another, denote 1, 2 or 3, and the following applies to the sum (k+l): $1 \leq (k+l) \leq 3$. The compounds in which R" has this meaning are referred to by the sub-formulae 1b, 2b, 3b, 4b and 5b. Particular preference is given to those compounds of the sub-formulae 1b, 2b, 3b, 4b and 5b in which R" denotes —F, —Cl, —NCS, —CF$_3$, —OCHF$_2$ or —OCF$_3$.

In the compounds of the sub-formulae 1b, 2b, 3b, 4b and 5b, R' has the meaning indicated for the compounds of the sub-formulae 1a to 5a and is preferably alkyl, alkenyl, alkoxy or alkoxyalkyl.

In a further smaller sub-group of the compounds of the formulae 1, 2, 3, 4 and 5, R" denotes —CN. This sub-group is referred to below as group C, and the compounds of this sub-group are correspondingly described by sub-formulae 1c, 2c, 3c, 4c and 5c. In the compounds of the sub-formulae 1c, 2c, 3c, 4c and 5c, R' has the meaning indicated for the compounds of the sub-formulae 1a to 5a and preferably denotes alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides the compounds of the formula I according to the invention, the media according to the invention preferably comprise one or more compounds selected from groups A, B and/or C. The proportions by weight of the compounds from these groups in the media according to the invention are preferably group A: 0 to 90%, preferably 20 to 90%, in particular 30 to 90% group B: 0 to 80%, preferably 10 to 80%, in particular 10 to 65% group C: 0 to 80%, preferably 5 to 80%, in particular 5 to 50%, where the sum of the proportions by weight of the group A, B and/or C compounds present in the respective media according to the invention is preferably 5 to 90% and in particular 10 to 90%.

The media according to the invention preferably comprise 1 to 40%, particularly preferably 5 to 30%, of the compounds of the formula I according to the invention. Preference is furthermore given to media comprising more than 40%, particularly preferably 45 to 90%, of compounds of the formula I according to the invention. The media preferably comprise three, four or five compounds according to the invention.

The liquid-crystal mixtures which can be used in accordance with the invention are prepared in a manner which is conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, for example homologue mixtures, or using so-called "multi-bottle" systems.

The dielectrics may also comprise further additives known to the person skilled in the art and described in the literature. For example, 0 to 15%, preferably 0 to 10%, of pleochroic dyes and/or chiral dopants can be added. The individual compounds added are employed in concentrations of 0.01 to 6%, preferably 0.1 to 3%. However, the concentration data of the other constituents of the liquid-crystal mixtures, i.e. the liquid-crystalline or mesogenic compounds are indicated without taking into account the concentration of these additives.

In the present application and in the following examples, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m C atoms respectively n and m are an integers, preferably 1, 2, 3, 4, 5, 6, 7, 8, 9, 10, 11 or 12, where n=m or n≠m. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| nN | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nOF | $OC_nH_{2n+1}$ | F | H | H |
| nF.F | $C_nH_{2n+1}$ | F | H | F |
| nmF | $C_nH_{2n+1}$ | $C_mH_{2m+1}$ | H | F |
| nCF3 | $C_nH_{2n+1}$ | $CF_3$ | H | H |
| nOCF3 | $C_nH_{2n+1}$ | $OCF_3$ | H | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are indicated in Tables A and B.

TABLE A

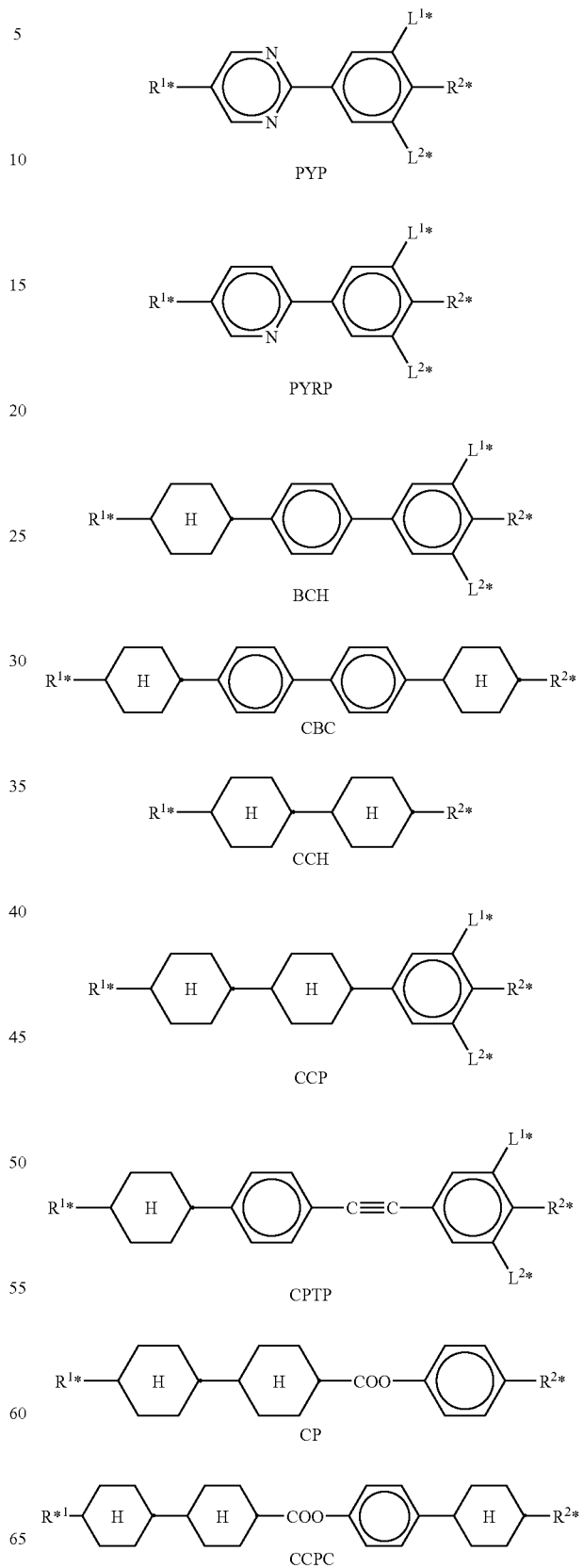

TABLE A-continued
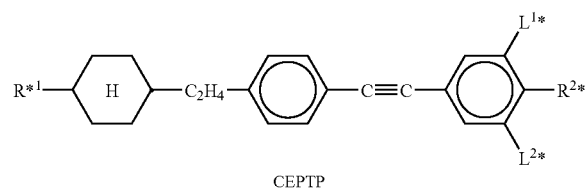
CEPTP
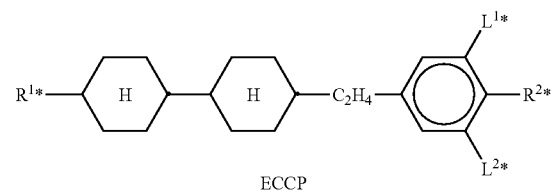
ECCP
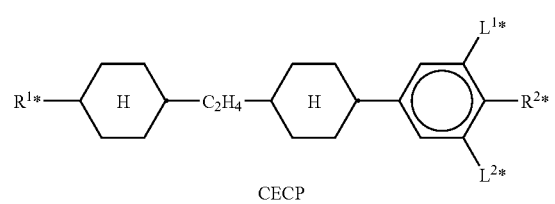
CECP
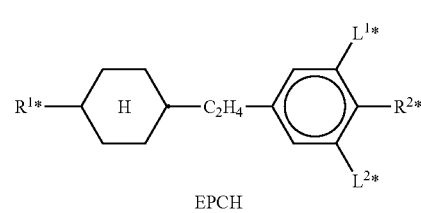
EPCH
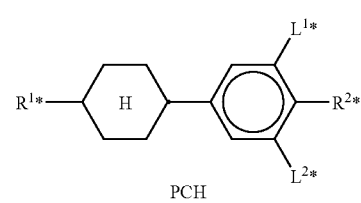
PCH
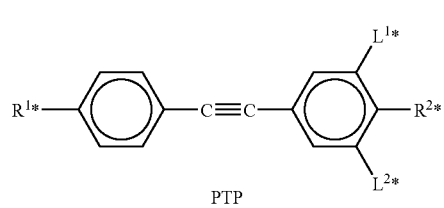
PTP
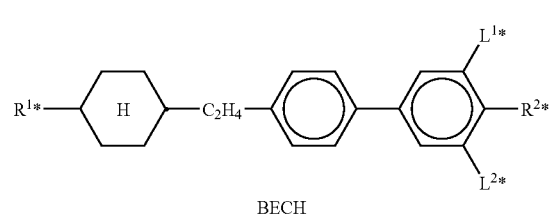
BECH
TABLE A-continued
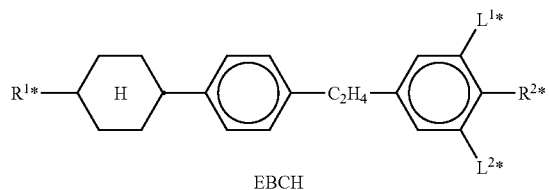
EBCH
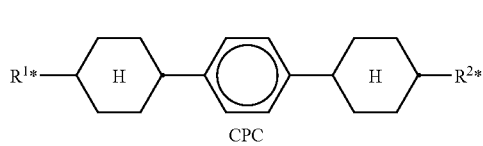
CPC
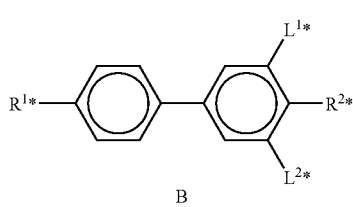
B
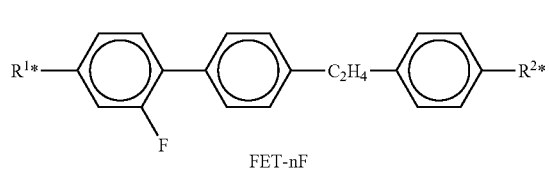
FET-nF
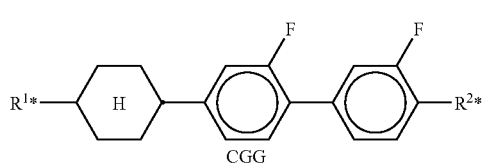
CGG
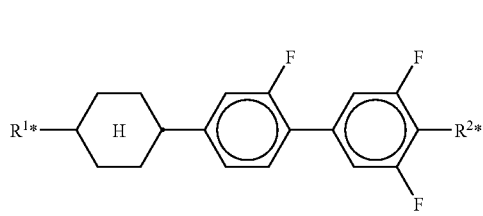
CGU
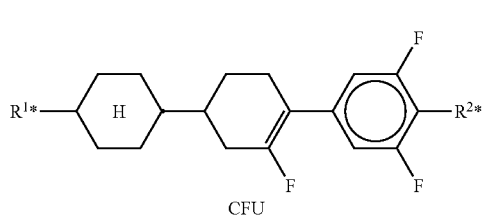
CFU TABLE B
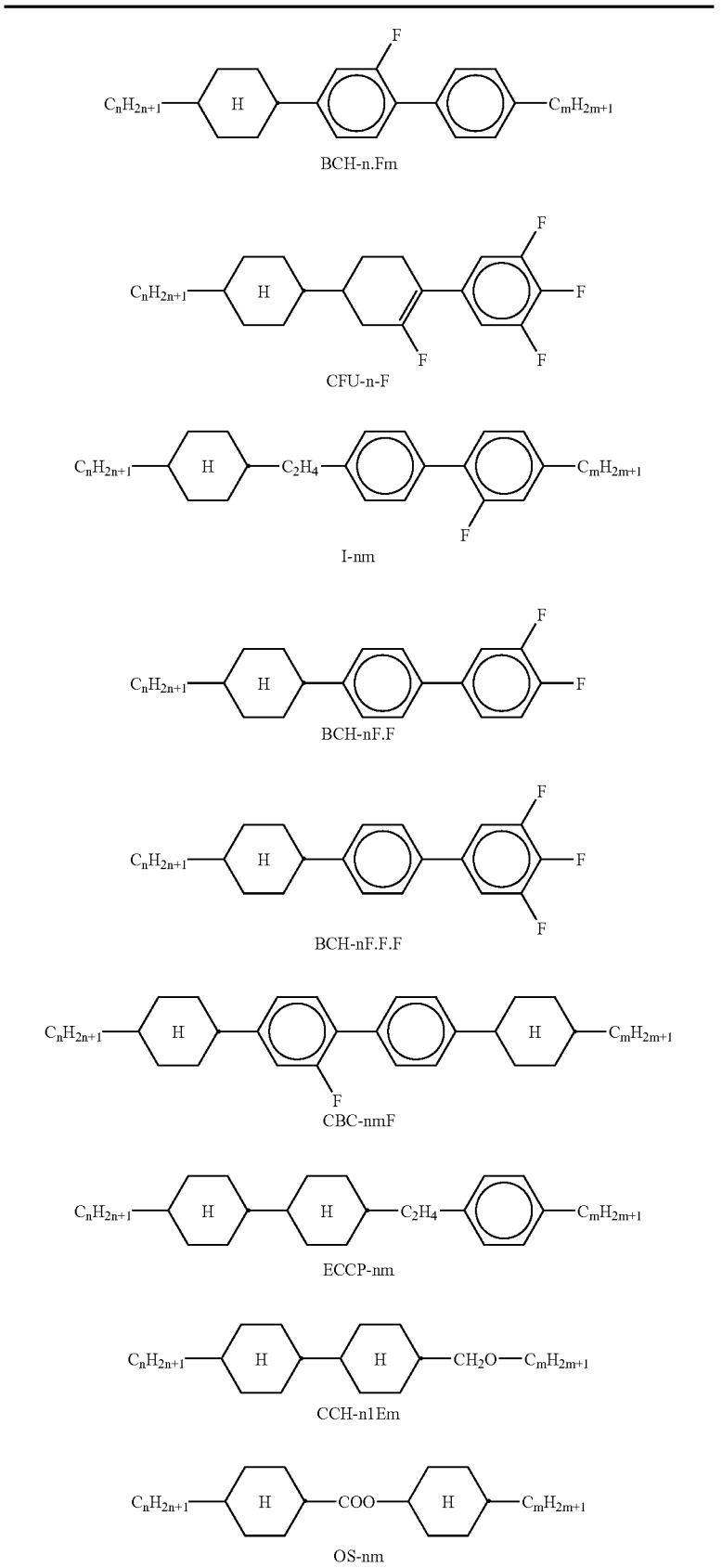

TABLE B-continued
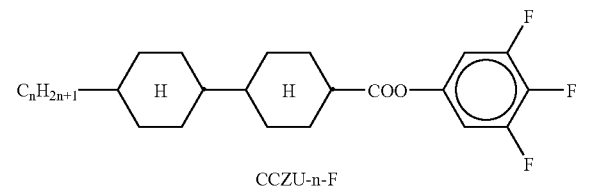
CCZU-n-F
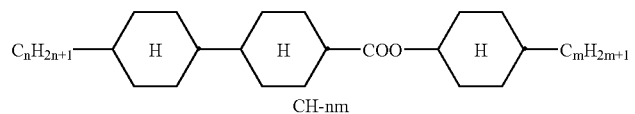
CH-nm
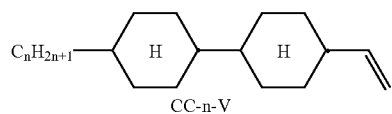
CC-n-V
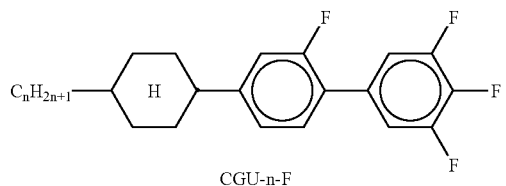
CGU-n-F
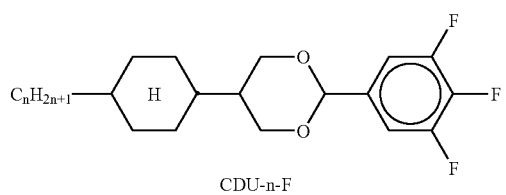
CDU-n-F
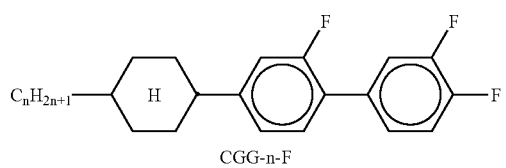
CGG-n-F
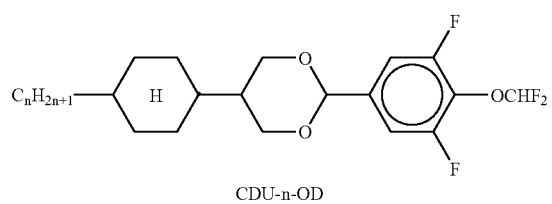
CDU-n-OD
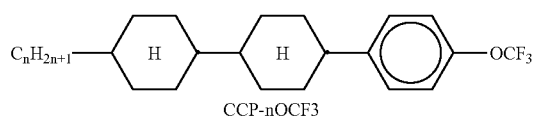
CCP-nOCF3
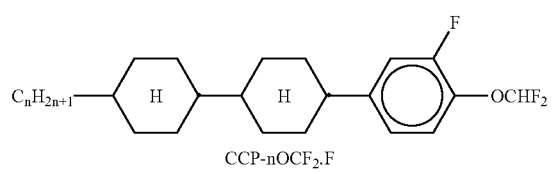
CCP-nOCF2.F TABLE B-continued
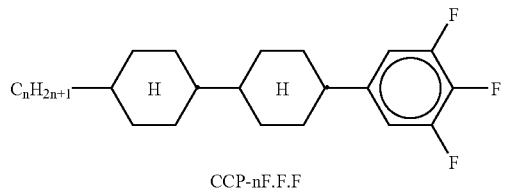
CCP-nF.F.F
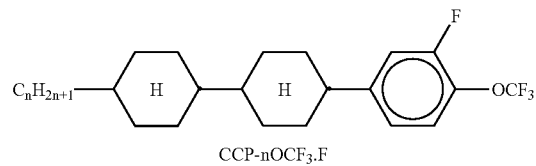
CCP-nOCF3.F
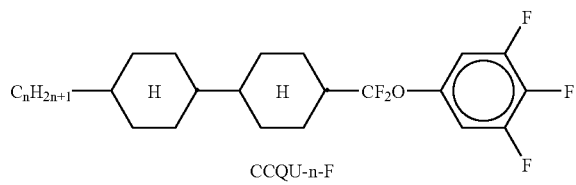
CCQU-n-F
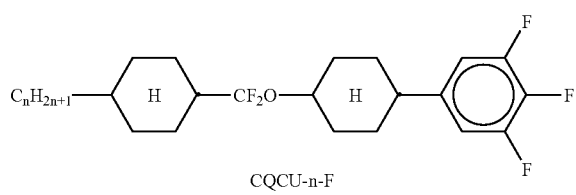
CQCU-n-F
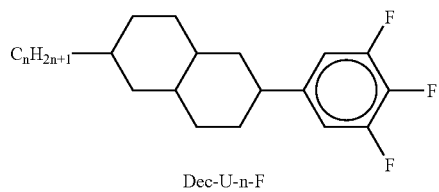
Dec-U-n-F
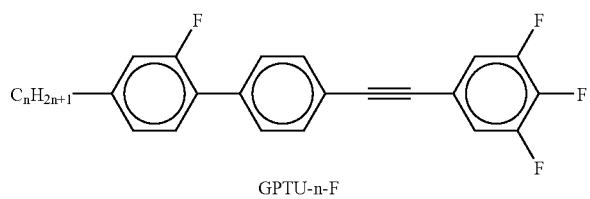
GPTU-n-F
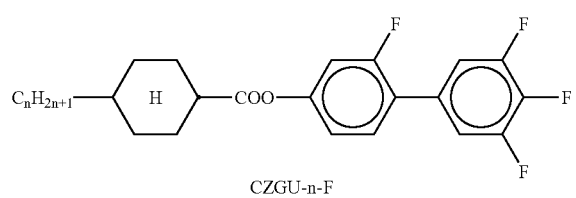
CZGU-n-F
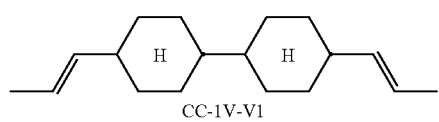
CC-1V-V1

TABLE B-continued
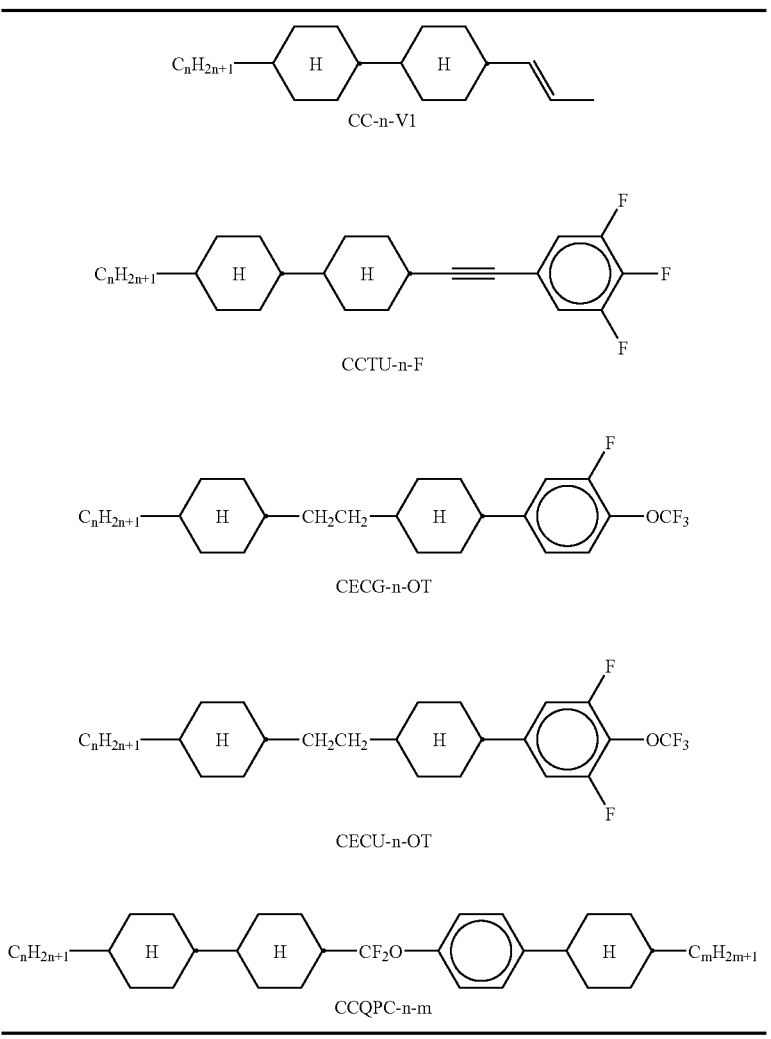
| TABLE C | TABLE C-continued |
|---|---|
| Table C shows possible dopants which are preferably added to the mixtures according to the invention. | Table C shows possible dopants which are preferably added to the mixtures according to the invention. |
| 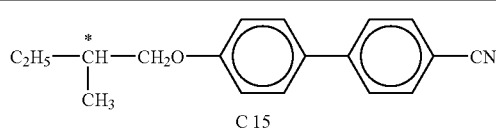 C 15 <br> 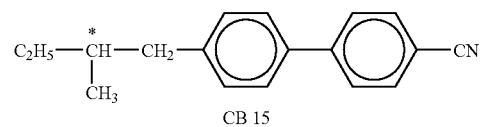 CB 15 <br> 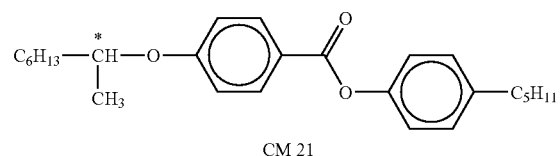 CM 21 | 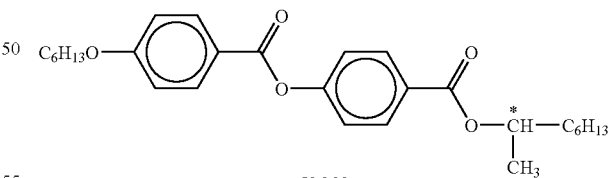 CM 33 <br> 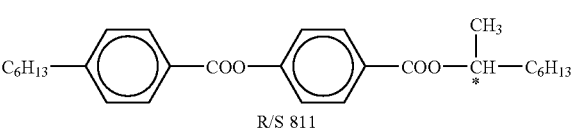 R/S 811 <br> 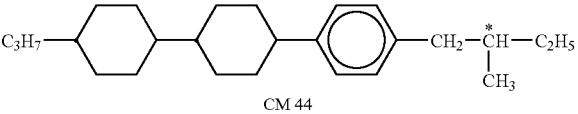 CM 44 |

TABLE C-continued

Table C shows possible dopants which are preferably added to the mixtures according to the invention.

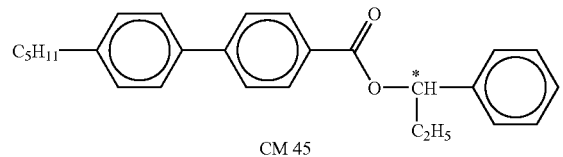
CM 45

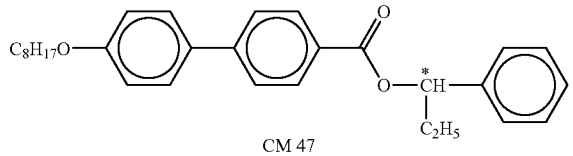
CM 47

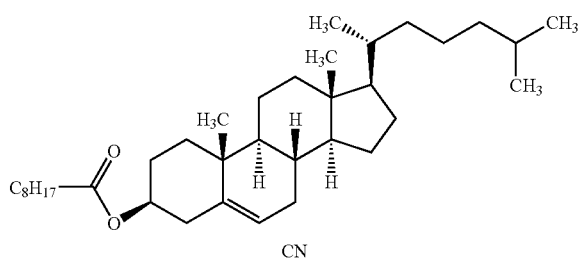
CN

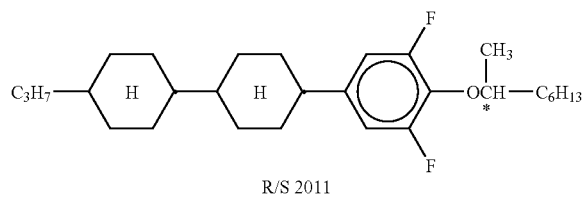
R/S 2011

Particular preference is given to mixtures according to the invention which, besides one or more compounds of the formula I, comprise two, three or more compounds selected from Table B.

The following examples are intended to explain the invention without limiting it. Above and below, percentages are percent by weight. All temperatures are given in degrees Celsius. m.p. denotes melting point and cl.p.=clearing point. Furthermore, C=crystalline state, N=nematic phase, Sm=smectic phase and I=isotropic phase. The data between these symbols represent the transition temperatures. $\Delta n$ denotes optical anisotropy (589 nm, 20° C.), and $\Delta \epsilon$ the dielectric anisotropy (1 kHz, 20° C.).

The $\Delta n$ and $\Delta \epsilon$ values of the compounds according to the invention were obtained by extrapolation from liquid-crystalline mixtures which consisted of 10% of the respective compound according to the invention and 90% of the commercially available liquid crystal ZLI 4792 (Merck, Darmstadt).

"Conventional work-up" means that water is added if necessary, the mixture is extracted with methylene chloride, diethyl ether or toluene, the phases are separated, the organic phase is dried and evaporated, and the product is purified by distillation under reduced pressure or crystallisation and/or chromatography.

Above and below, the following abbreviations are used:
DBH 1,3-dibromo-5,5-dimethylhydantoin
DMF dimethylformamide
LDA Lithium diisopropylamide
n-BuLi n-butyllithium
RT room temperature (about 20° C.)
THF tetrahydrofuran

EXAMPLE 1

The compound of the following formula

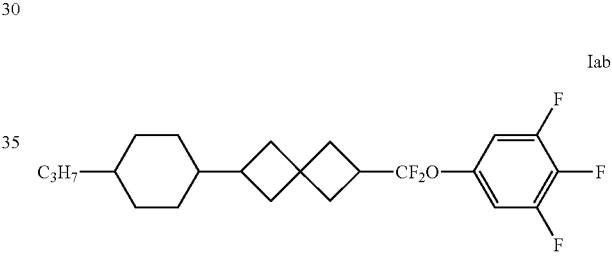

Iab 2-(difluoro[3,4,5-trifluorophenyl]oxymethyl)-6-(4-propylcyclohexyl)spiro-[3.3]heptane [7]

is prepared as follows:

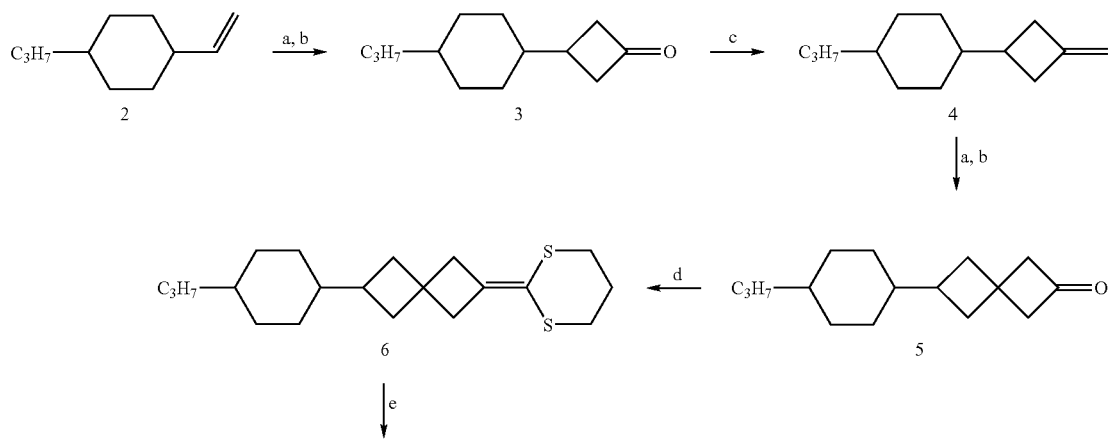

-continued

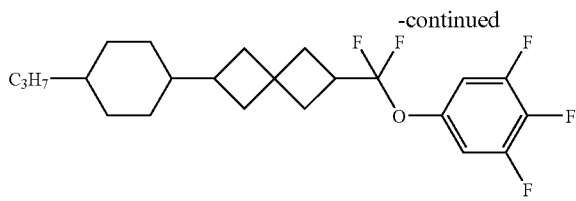

7

Reagents and reaction conditions: a) trichloroacetyl chloride, Zn, ether; b) Zn, HOAc; c) (Ph₃P)CH⁺Br⁻, KOtBu, THF; 2-trimethylsilyl-1,3-dithiane, nBuLi, THF, −78° C.→RT; e) 1. 3,4,5-trifluorophenol, Et₃N, CH₂Cl₂, −78° C.; 2. Et₃N.3HF, DBH, 78° C.→RT.

Step 1

2-(6-{4-n-Propylcyclohexyl}spiro[3.3]hept-2-ylidene)[1,3]dithiane 6

15.5 g (80.3 mmol) of 2-trimethylsilyl-1,3-dithiane are dissolved in 150 ml of THF, and 51 ml (80.3 mmol) of n-BuLi (15 percent in hexane) are rapidly added dropwise at −70° C. The batch is subsequently allowed to thaw to 0° C. over the course of 4 hours, stirred for 10 minutes without cooling and re-cooled to −70° C., and a solution of 17.0 g (72.5 mmol) of 6-(4-n-propylcyclohexyl)spiro[3.3]heptan-2-one 5 in 50 ml of THF is added drop-wise. The batch is left to stir overnight at room temperature, hydrolysed using saturated sodium hydrogencarbonate solution and extracted with dichloromethane. The combined organic phases are washed with water and dried over sodium sulfate. The solvent is removed under reduced pressure, and the crude product is recrystallised from n-heptane. The dithioacetal 6 is obtained as colourless flakes.

Step 2

10.0 g (29.7 mmol) of the dithioacetal 6 are dissolved in 100 ml of dichloro-methane, and 2.6 ml (30.0 mmol) of trifluoromethanesulfonic acid are added dropwise with ice/common salt cooling. After 5 minutes, the cooling is removed, and the batch is stirred at room temperature for 45 minutes. The batch is subsequently cooled to −70° C., a mixture of 7.5 ml (54.0 mmol) of triethylamine and 6.67 g (45.0 mmol) of trifluorophenol in 30 ml of dichloromethane is added, and the mixture is stirred at −70° C. for 1 hour. 24.2 ml (0.150 mol) of triethylamine tris(hydrofluoride) are then added, and, after 5 minutes, 42.9 g (0.150 mol) of DBH, suspended in 60 ml of dichloromethane, are added in portions over the course of about 30 minutes. After 90 minutes, the batch is allowed to thaw and is hydro-lysed using 1 M sodium hydroxide solution and aqueous hydrogen sulfite solution. The organic phase is separated off, washed with saturated sodium chloride solution and dried over sodium sulfate. The solvent is removed under reduced pressure, and the residue is filtered through silica gel with n-heptane, giving the spiro compound 7 as a colourless solid of melting point: 43° C.

C 43 N 46.6 I

Δε=9.1

Δn=0.0668

γ₁=132 mPa·s $^{19}$F-NMR (235 MHz, CDCl₃) δ=−79.2 ppm (d, $^3J_{F,H}$=10.6 Hz, 2F, CF₂O), −133.2 (m$_c$, 2F, Ar—F), −164.7 (tt, $^3J_{F,F}$=20.8 Hz, $^4J_{F,H}$=5.9 Hz, 1F, Ar—F).

The following compounds according to the invention are obtained analogously to Example 1 using the corresponding precursors:

Examples 2-126

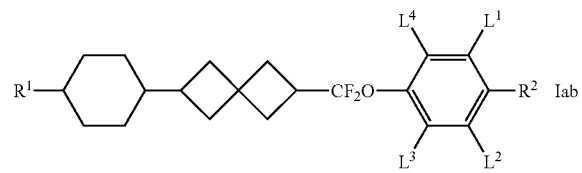

Examples 127-252

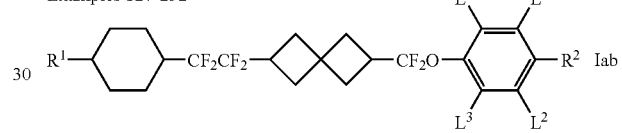

Examples 253-378

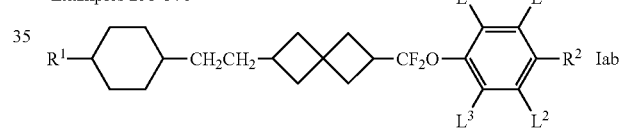

Examples 379-504

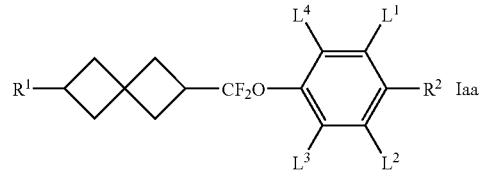

| Examples | | | R¹ | L¹ | L² | L³ | L⁴ | R² |
|---|---|---|---|---|---|---|---|---|
| 1. | 127. | 253. | 379. | C₃H₇ | F | F | H | H | F |
| 2. | 128. | 254. | 380. | C₃H₇ | F | H | H | H | F |
| 3. | 129. | 255. | 381. | C₃H₇ | H | H | H | H | F |
| 4. | 130. | 256. | 382. | C₂H₅ | H | H | H | H | F |
| 5. | 131. | 257. | 383. | C₂H₅ | F | H | H | H | F |
| 6. | 132. | 258. | 384. | C₂H₅ | F | F | H | H | F |
| 7. | 133. | 259. | 385. | C₄H₉ | H | H | H | H | F |
| 8. | 134. | 260. | 386. | C₄H₉ | F | H | H | H | F |
| 9. | 135. | 261. | 387. | C₄H₉ | F | F | H | H | F |
| 10. | 136. | 262. | 388. | C₅H₁₁ | H | H | H | H | F |
| 11. | 137. | 263. | 389. | C₅H₁₁ | F | H | H | H | F |
| 12. | 138. | 264. | 390. | C₅H₁₁ | F | F | H | H | F |
| 13. | 139. | 265. | 391. | C₆H₁₃ | H | H | H | H | F |
| 14. | 140. | 266. | 392. | C₆H₁₃ | F | H | H | H | F |
| 15. | 141. | 267. | 393. | C₆H₁₃ | F | F | H | H | F |
| 16. | 142. | 268. | 394. | C₇H₁₅ | H | H | H | H | F |
| 17. | 143. | 269. | 395. | C₇H₁₅ | F | H | H | H | F |
| 18. | 144. | 270. | 396. | C₇H₁₅ | F | F | H | H | F |
| 19. | 145. | 271. | 397. | C₂H₅ | H | H | H | H | CF₃ |
| 20. | 146. | 272. | 398. | C₂H₅ | F | H | H | H | CF₃ |
| 21. | 147. | 273. | 399. | C₂H₅ | F | F | H | H | CF₃ |

-continued

Examples 2-126

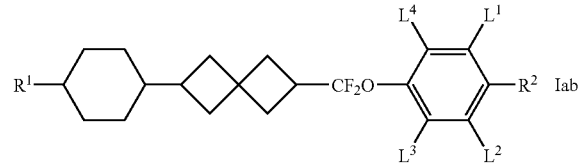 Iab

Examples 127-252

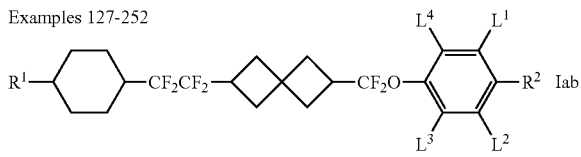 Iab

Examples 253-378

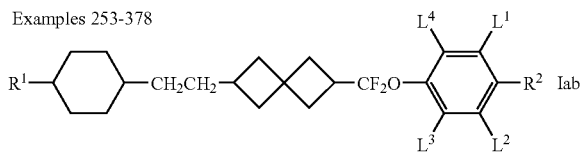 Iab

Examples 379-504

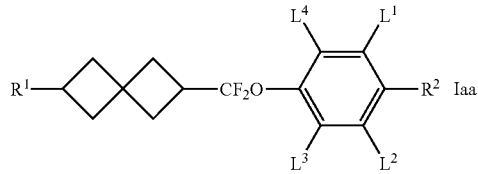 Iaa

-continued

Examples 2-126

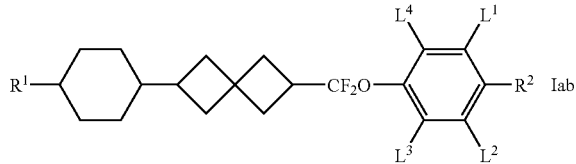 Iab

Examples 127-252

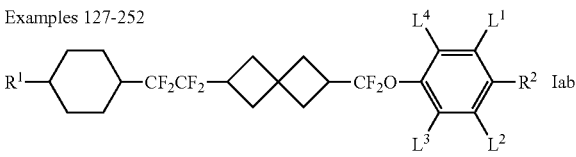 Iab

Examples 253-378

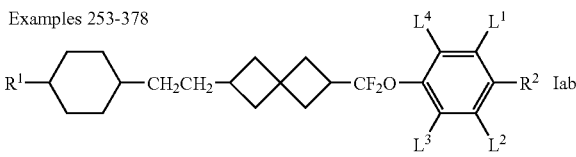 Iab

Examples 379-504

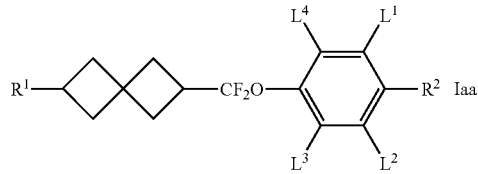 Iaa

| | Examples | | | $R^1$ | $L^1$ | $L^2$ | $L^3$ | $L^4$ | $R^2$ | | Examples | | | $R^1$ | $L^1$ | $L^2$ | $L^3$ | $L^4$ | $R^2$ |
|---|---|---|---|---|---|---|---|---|---|---|---|---|---|---|---|---|---|---|---|
| 22. | 148. | 274. | 400. | $C_3H_7$ | H | H | H | H | $CF_3$ | 62. | 188. | 314. | 440. | $C_4H_9$ | F | H | H | H | CN |
| 23. | 149. | 275. | 401. | $C_3H_7$ | F | H | H | H | $CF_3$ | 63. | 189. | 315. | 441. | $C_4H_9$ | F | F | H | H | CN |
| 24. | 150. | 276. | 402. | $C_3H_7$ | F | F | H | H | $CF_3$ | 64. | 190. | 316. | 442. | $C_5H_{11}$ | H | H | H | H | CN |
| 25. | 151. | 277. | 403. | $C_4H_9$ | H | H | H | H | $CF_3$ | 65. | 191. | 317. | 443. | $C_5H_{11}$ | F | H | H | H | CN |
| 26. | 152. | 278. | 404. | $C_4H_9$ | F | H | H | H | $CF_3$ | 66. | 192. | 318. | 444. | $C_5H_{11}$ | F | F | H | H | CN |
| 27. | 153. | 279. | 405. | $C_4H_9$ | F | F | H | H | $CF_3$ | 67. | 193. | 319. | 445. | $C_6H_{13}$ | H | H | H | H | CN |
| 28. | 154. | 280. | 406. | $C_5H_{11}$ | H | H | H | H | $CF_3$ | 68. | 194. | 320. | 446. | $C_6H_{13}$ | F | H | H | H | CN |
| 29. | 155. | 281. | 407. | $C_5H_{11}$ | F | H | H | H | $CF_3$ | 69. | 195. | 321. | 447. | $C_6H_{13}$ | F | F | H | H | CN |
| 30. | 156. | 282. | 408. | $C_5H_{11}$ | F | F | H | H | $CF_3$ | 70. | 196. | 322. | 448. | $C_7H_{15}$ | H | H | H | H | CN |
| 31. | 157. | 283. | 409. | $C_6H_{13}$ | H | H | H | H | $CF_3$ | 71. | 197. | 323. | 449. | $C_7H_{15}$ | F | H | H | H | CN |
| 32. | 158. | 284. | 410. | $C_6H_{13}$ | F | H | H | H | $CF_3$ | 72. | 198. | 324. | 450. | $C_7H_{15}$ | F | F | H | H | CN |
| 33. | 159. | 285. | 411. | $C_6H_{13}$ | F | F | H | H | $CF_3$ | 73. | 199. | 325. | 451. | $C_2H_5$ | H | H | H | H | NCS |
| 34. | 160. | 286. | 412. | $C_7H_{15}$ | H | H | H | H | $CF_3$ | 74. | 200. | 326. | 452. | $C_2H_5$ | F | H | H | H | NCS |
| 35. | 161. | 287. | 413. | $C_7H_{15}$ | F | H | H | H | $CF_3$ | 75. | 201. | 327. | 453. | $C_2H_5$ | F | F | H | H | NCS |
| 36. | 162. | 288. | 414. | $C_7H_{15}$ | F | F | H | H | $CF_3$ | 76. | 202. | 328. | 454. | $C_3H_7$ | H | H | H | H | NCS |
| 37. | 163. | 289. | 415. | $C_2H_5$ | H | H | H | H | $OCF_3$ | 77. | 203. | 329. | 455. | $C_3H_7$ | F | H | H | H | NCS |
| 38. | 164. | 290. | 416. | $C_2H_5$ | F | H | H | H | $OCF_3$ | 78. | 204. | 330. | 456. | $C_3H_7$ | F | F | H | H | NCS |
| 39. | 165. | 291. | 417. | $C_2H_5$ | F | F | H | H | $OCF_3$ | 79. | 205. | 331. | 457. | $C_4H_9$ | H | H | H | H | NCS |
| 40. | 166. | 292. | 418. | $C_3H_7$ | H | H | H | H | $OCF_3$ | 80. | 206. | 332. | 458. | $C_4H_9$ | F | H | H | H | NCS |
| 41. | 167. | 293. | 419. | $C_3H_7$ | F | H | H | H | $OCF_3$ | 81. | 207. | 333. | 459. | $C_4H_9$ | F | F | H | H | NCS |
| 42. | 168. | 294. | 420. | $C_3H_7$ | F | F | H | H | $OCF_3$ | 82. | 208. | 334. | 460. | $C_5H_{11}$ | H | H | H | H | NCS |
| 43. | 169. | 295. | 421. | $C_4H_9$ | H | H | H | H | $OCF_3$ | 83. | 209. | 335. | 461. | $C_5H_{11}$ | F | H | H | H | NCS |
| 44. | 170. | 296. | 422. | $C_4H_9$ | F | H | H | H | $OCF_3$ | 84. | 210. | 336. | 462. | $C_5H_{11}$ | F | F | H | H | NCS |
| 45. | 171. | 297. | 423. | $C_4H_9$ | F | F | H | H | $OCF_3$ | 85. | 211. | 337. | 463. | $C_6H_{13}$ | H | H | H | H | NCS |
| 46. | 172. | 298. | 424. | $C_5H_{11}$ | H | H | H | H | $OCF_3$ | 86. | 212. | 338. | 464. | $C_6H_{13}$ | F | H | H | H | NCS |
| 47. | 173. | 299. | 425. | $C_5H_{11}$ | F | H | H | H | $OCF_3$ | 87. | 213. | 339. | 465. | $C_6H_{13}$ | F | F | H | H | NCS |
| 48. | 174. | 300. | 426. | $C_5H_{11}$ | F | F | H | H | $OCF_3$ | 88. | 214. | 340. | 466. | $C_7H_{15}$ | H | H | H | H | NCS |
| 49. | 175. | 301. | 427. | $C_6H_{13}$ | H | H | H | H | $OCF_3$ | 89. | 215. | 341. | 467. | $C_7H_{15}$ | F | H | H | H | NCS |
| 50. | 176. | 302. | 428. | $C_6H_{13}$ | F | H | H | H | $OCF_3$ | 90. | 216. | 342. | 468. | $C_7H_{15}$ | F | F | H | H | NCS |
| 51. | 177. | 303. | 429. | $C_6H_{13}$ | F | F | H | H | $OCF_3$ | 91. | 217. | 343. | 469. | $C_2H_5$ | H | H | H | H | $SF_5$ |
| 52. | 178. | 304. | 430. | $C_7H_{15}$ | H | H | H | H | $OCF_3$ | 92. | 218. | 344. | 470. | $C_2H_5$ | F | H | H | H | $SF_5$ |
| 53. | 179. | 305. | 431. | $C_7H_{15}$ | F | H | H | H | $OCF_3$ | 93. | 219. | 345. | 471. | $C_2H_5$ | F | F | H | H | $SF_5$ |
| 54. | 180. | 306. | 432. | $C_7H_{15}$ | F | F | H | H | $OCF_3$ | 94. | 220. | 346. | 472. | $C_3H_7$ | H | H | H | H | $SF_5$ |
| 55. | 181. | 307. | 433. | $C_2H_5$ | H | H | H | H | CN | 95. | 221. | 347. | 473. | $C_3H_7$ | F | H | H | H | $SF_5$ |
| 56. | 182. | 308. | 434. | $C_2H_5$ | F | H | H | H | CN | 96. | 222. | 348. | 474. | $C_3H_7$ | F | F | H | H | $SF_5$ |
| 57. | 183. | 309. | 435. | $C_2H_5$ | F | F | H | H | CN | 97. | 223. | 349. | 475. | $C_4H_9$ | H | H | H | H | $SF_5$ |
| 58. | 184. | 310. | 436. | $C_3H_7$ | H | H | H | H | CN | 98. | 224. | 350. | 476. | $C_4H_9$ | F | H | H | H | $SF_5$ |
| 59. | 185. | 311. | 437. | $C_3H_7$ | F | H | H | H | CN | 99. | 225. | 351. | 477. | $C_4H_9$ | F | F | H | H | $SF_5$ |
| 60. | 186. | 312. | 438. | $C_3H_7$ | F | F | H | H | CN | 100. | 226. | 352. | 478. | $C_5H_{11}$ | H | H | H | H | $SF_5$ |
| 61. | 187. | 313. | 439. | $C_4H_9$ | H | H | H | H | CN | 101. | 227. | 353. | 479. | $C_5H_{11}$ | F | H | H | H | $SF_5$ |

-continued

Examples 2-126

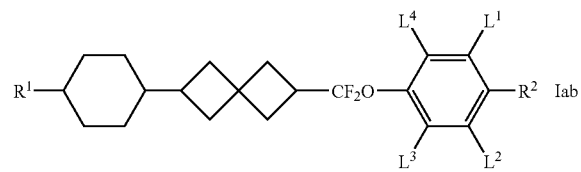

Examples 127-252

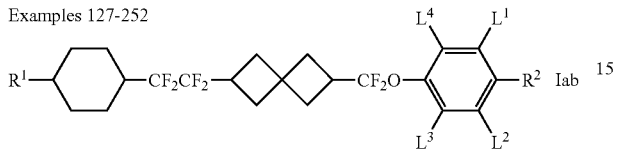

Examples 253-378

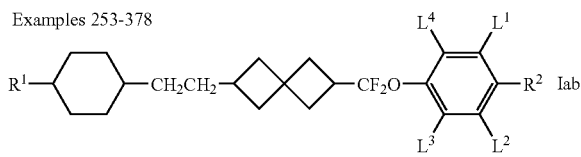

Examples 379-504

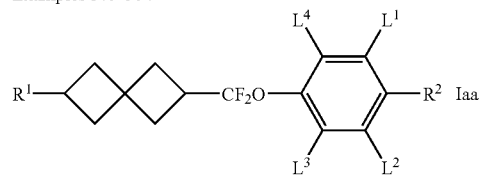

| Examples | | | | $R^1$ | $L^1$ | $L^2$ | $L^3$ | $L^4$ | $R^2$ |
|---|---|---|---|---|---|---|---|---|---|
| 102. | 228. | 354. | 480. | $C_5H_{11}$ | F | F | H | H | $SF_5$ |
| 103. | 229. | 355. | 481. | $C_6H_{13}$ | H | H | H | H | $SF_5$ |
| 104. | 230. | 356. | 482. | $C_6H_{13}$ | F | H | H | H | $SF_5$ |
| 105. | 231. | 357. | 483. | $C_6H_{13}$ | F | F | H | H | $SF_5$ |
| 106. | 232. | 358. | 484. | $C_7H_{15}$ | H | H | H | H | $SF_5$ |
| 107. | 233. | 359. | 485. | $C_7H_{15}$ | F | H | H | H | $SF_5$ |
| 108. | 234. | 360. | 486. | $C_7H_{15}$ | F | F | H | H | $SF_5$ |
| 109. | 235. | 361. | 487. | $C_2H_5$ | H | H | H | H | $OC_2H_5$ |
| 110. | 236. | 362. | 488. | $C_2H_5$ | F | H | H | H | $OC_2H_5$ |
| 111. | 237. | 363. | 489. | $C_2H_5$ | F | H | F | H | $OC_2H_5$ |
| 112. | 238. | 364. | 490. | $C_3H_7$ | H | H | H | H | $OC_2H_5$ |
| 113. | 239. | 365. | 491. | $C_3H_7$ | F | H | H | H | $OC_2H_5$ |
| 114. | 240. | 366. | 492. | $C_3H_7$ | F | H | F | H | $OC_2H_5$ |
| 115. | 241. | 367. | 493. | $C_4H_9$ | H | H | H | H | $OC_2H_5$ |
| 116. | 242. | 368. | 494. | $C_4H_9$ | F | H | H | H | $OC_2H_5$ |
| 117. | 243. | 369. | 495. | $C_4H_9$ | F | H | F | H | $OC_2H_5$ |
| 118. | 244. | 370. | 496. | $C_5H_{11}$ | H | H | H | H | $OC_2H_5$ |
| 119. | 245. | 371. | 497. | $C_5H_{11}$ | F | H | H | H | $OC_2H_5$ |
| 120. | 246. | 372. | 498. | $C_5H_{11}$ | F | H | F | H | $OC_2H_5$ |
| 121. | 247. | 373. | 499. | $C_6H_{13}$ | H | H | H | H | $OC_2H_5$ |
| 122. | 248. | 374. | 500. | $C_6H_{13}$ | F | H | H | H | $OC_2H_5$ |
| 123. | 249. | 375. | 501. | $C_6H_{13}$ | F | H | F | H | $OC_2H_5$ |
| 124. | 250. | 376. | 502. | $C_7H_{15}$ | H | H | H | H | $OC_2H_5$ |
| 125. | 251. | 377. | 503. | $C_7H_{15}$ | F | H | H | H | $OC_2H_5$ |
| 126. | 252. | 378. | 504. | $C_7H_{15}$ | F | H | F | H | $OC_2H_5$ |

EXAMPLE 505

The compound of the following formula

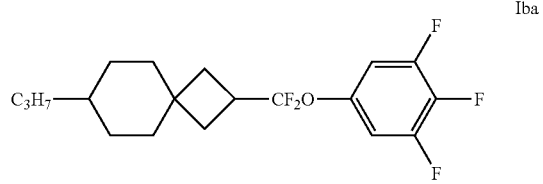

2-(difluoro[3,4,5-trifluorophenyl]oxymethyl)-7-(4-n-propylcyclohexyl)spiro-[5.3]nonane (11)

is prepared as follows:

2-(difluoro[3,4,5-trifluorophenyl]oxymethyl)-7-(4-n-propylcyclohexyl)spiro-[5.3]nonane (11) is obtained from 7-(4-n-propylcyclohexyl)spiro[5.3]nonan-2-one (9) analogously to the synthesis described in Example 1.

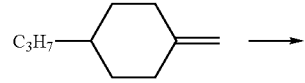

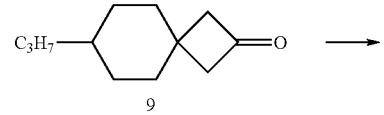

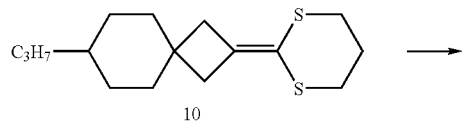

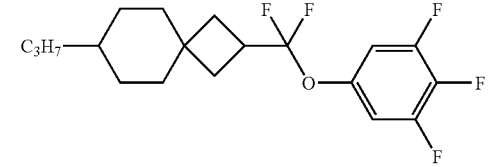

8.90 g (32.0 mmol) of the dithioacetal 10 are dissolved in 80 ml of dichloromethane, and 2.8 ml (32.0 mmol) of trifluoromethanesulfonic acid are added dropwise with ice/common salt cooling. After 5 minutes, the cooling is removed, and the batch is stirred at room temperature for 45 minutes. The batch is subsequently cooled to −70° C., a mixture of 7.1 ml (51.0 mmol) of triethylamine and 7.10 g (48.0 mmol) of trifluorophenol in 80 ml of dichloromethane is added, and the batch is stirred at −70° C. for 1 hour. 25.8 ml (0.160 mol) of triethylamine tris(hydrofluoride) are then added, and, after 5 minutes, 45.8 g (0.150 mol) of DBH, suspended in 60 ml of dichloromethane, are added in portions over the course of about 30 minutes. After 90 minutes, the batch is allowed to thaw and is hydrolysed using 1 M sodium hydroxide solution and aqueous hydrogen sulfite solution. The organic phase is separated off, washed with saturated sodium chloride solution and dried over sodium sulfate. The solvent is removed under reduced pressure, and the residue is filtered through silica gel with n-heptane. The crude product is purified by bulb-tube distillation (boiling point: 158° C./0.1 mbar), giving the spiro compound 11.

Δε=7.4

Δn=0.0641

The following compounds according to the invention are obtained analogously to Example 505 using the corresponding precursors:

Examples 506-630

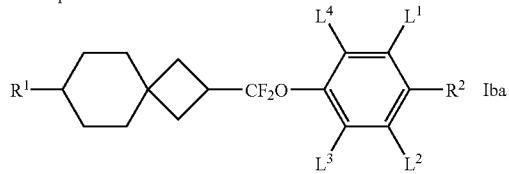

Examples 631-756

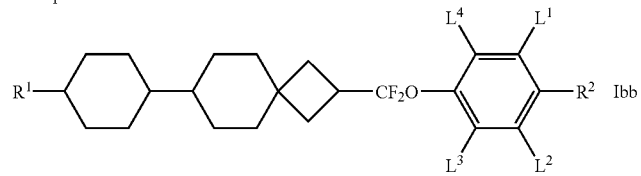

Examples 757-882

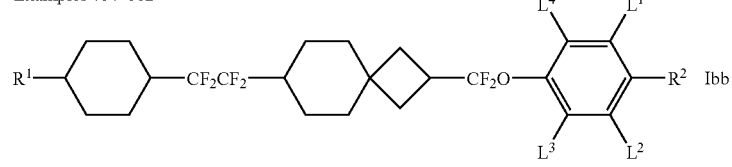

Examples 883-1008

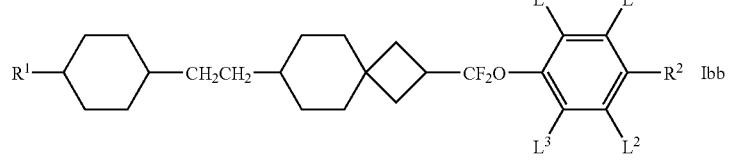

| Examples | | | | $R^1$ | $L^1$ | $L^2$ | $L^3$ | $L^4$ | $R^2$ |
|---|---|---|---|---|---|---|---|---|---|
| 505. | 631. | 757. | 883. | $C_3H_7$ | F | F | H | H | F |
| 506. | 632. | 758. | 884. | $C_3H_7$ | F | H | H | H | F |
| 507. | 633. | 759. | 885. | $C_3H_7$ | H | H | H | H | F |
| 508. | 634. | 760. | 886. | $C_2H_5$ | H | H | H | H | F |
| 509. | 635. | 761. | 887. | $C_2H_5$ | F | H | H | H | F |
| 510. | 636. | 762. | 888. | $C_2H_5$ | F | F | H | H | F |
| 511. | 637. | 763. | 889. | $C_4H_9$ | H | H | H | H | F |
| 512. | 638. | 764. | 890. | $C_4H_9$ | F | H | H | H | F |
| 513. | 639. | 765. | 891. | $C_4H_9$ | F | F | H | H | F |
| 514. | 640. | 766. | 892. | $C_5H_{11}$ | H | H | H | H | F |
| 515. | 641. | 767. | 893. | $C_5H_{11}$ | F | H | H | H | F |
| 516. | 642. | 768. | 894. | $C_5H_{11}$ | F | F | H | H | F |
| 517. | 643. | 769. | 895. | $C_6H_{13}$ | H | H | H | H | F |
| 518. | 644. | 770. | 896. | $C_6H_{13}$ | F | H | H | H | F |
| 519. | 645. | 771. | 897. | $C_6H_{13}$ | F | F | H | H | F |
| 520. | 646. | 772. | 898. | $C_7H_{15}$ | H | H | H | H | F |
| 521. | 647. | 773. | 899. | $C_7H_{15}$ | F | H | H | H | F |
| 522. | 648. | 774. | 900. | $C_7H_{15}$ | F | F | H | H | F |
| 523. | 649. | 775. | 901. | $C_2H_5$ | H | H | H | H | $CF_3$ |
| 524. | 650. | 776. | 902. | $C_2H_5$ | F | H | H | H | $CF_3$ |
| 525. | 651. | 777. | 903. | $C_2H_5$ | F | F | H | H | $CF_3$ |
| 526. | 652. | 778. | 904. | $C_3H_7$ | H | H | H | H | $CF_3$ |
| 527. | 653. | 779. | 905. | $C_3H_7$ | F | H | H | H | $CF_3$ |
| 528. | 654. | 780. | 906. | $C_3H_7$ | F | F | H | H | $CF_3$ |
| 529. | 655. | 781. | 907. | $C_4H_9$ | H | H | H | H | $CF_3$ |
| 530. | 656. | 782. | 908. | $C_4H_9$ | F | H | H | H | $CF_3$ |
| 531. | 657. | 783. | 909. | $C_4H_9$ | F | F | H | H | $CF_3$ |
| 532. | 658. | 784. | 910. | $C_5H_{11}$ | H | H | H | H | $CF_3$ |
| 533. | 659. | 785. | 911. | $C_5H_{11}$ | F | H | H | H | $CF_3$ |

-continued

Examples 506-630

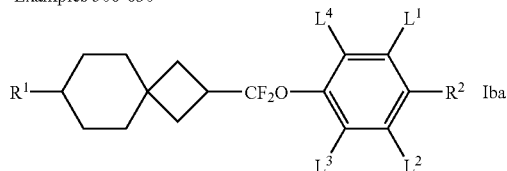 Iba

Examples 631-756

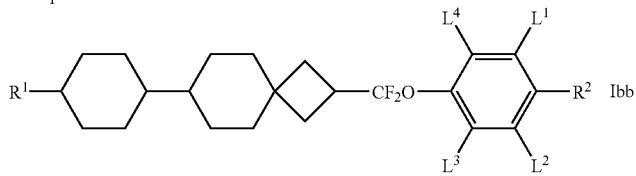 Ibb

Examples 757-882

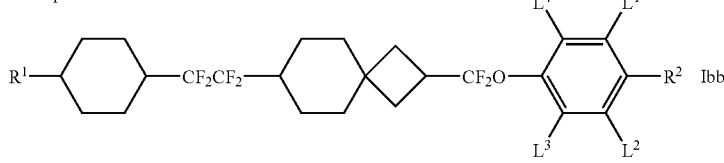 Ibb

Examples 883-1008

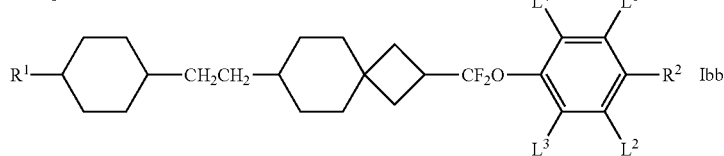 Ibb

| Examples | | | | R¹ | L¹ | L² | L³ | L⁴ | R² |
|---|---|---|---|---|---|---|---|---|---|
| 534. | 660. | 786. | 912. | $C_5H_{11}$ | F | F | H | H | $CF_3$ |
| 535. | 661. | 787. | 913. | $C_6H_{13}$ | H | H | H | H | $CF_3$ |
| 536. | 662. | 788. | 914. | $C_6H_{13}$ | F | H | H | H | $CF_3$ |
| 537. | 663. | 789. | 915. | $C_6H_{13}$ | F | F | H | H | $CF_3$ |
| 538. | 664. | 790. | 916. | $C_7H_{15}$ | H | H | H | H | $CF_3$ |
| 539. | 665. | 791. | 917. | $C_7H_{15}$ | F | H | H | H | $CF_3$ |
| 540. | 666. | 792. | 918. | $C_7H_{15}$ | F | F | H | H | $CF_3$ |
| 541. | 667. | 793. | 919. | $C_2H_5$ | H | H | H | H | $OCF_3$ |
| 542. | 668. | 794. | 920. | $C_2H_5$ | F | H | H | H | $OCF_3$ |
| 543. | 669. | 795. | 921. | $C_2H_5$ | F | F | H | H | $OCF_3$ |
| 544. | 670. | 796. | 922. | $C_3H_7$ | H | H | H | H | $OCF_3$ |
| 545. | 671. | 797. | 923. | $C_3H_7$ | F | H | H | H | $OCF_3$ |
| 546. | 672. | 798. | 924. | $C_3H_7$ | F | F | H | H | $OCF_3$ |
| 547. | 673. | 799. | 925. | $C_4H_9$ | H | H | H | H | $OCF_3$ |
| 548. | 674. | 800. | 926. | $C_4H_9$ | F | H | H | H | $OCF_3$ |
| 549. | 675. | 801. | 927. | $C_4H_9$ | F | F | H | H | $OCF_3$ |
| 550. | 676. | 802. | 928. | $C_5H_{11}$ | H | H | H | H | $OCF_3$ |
| 551. | 677. | 803. | 929. | $C_5H_{11}$ | F | H | H | H | $OCF_3$ |
| 552. | 678. | 804. | 930. | $C_5H_{11}$ | F | F | H | H | $OCF_3$ |
| 553. | 679. | 805. | 931. | $C_6H_{13}$ | H | H | H | H | $OCF_3$ |
| 554. | 680. | 806. | 932. | $C_6H_{13}$ | F | H | H | H | $OCF_3$ |
| 555. | 681. | 807. | 933. | $C_6H_{13}$ | F | F | H | H | $OCF_3$ |
| 556. | 682. | 808. | 934. | $C_7H_{15}$ | H | H | H | H | $OCF_3$ |
| 557. | 683. | 809. | 935. | $C_7H_{15}$ | F | H | H | H | $OCF_3$ |
| 558. | 684. | 810. | 936. | $C_7H_{15}$ | F | F | H | H | $OCF_3$ |
| 559. | 685. | 811. | 937. | $C_2H_5$ | H | H | H | H | CN |
| 560. | 686. | 812. | 938. | $C_2H_5$ | F | H | H | H | CN |
| 561. | 687. | 813. | 939. | $C_2H_5$ | F | F | H | H | CN |
| 562. | 688. | 814. | 940. | $C_3H_7$ | H | H | H | H | CN |
| 563. | 689. | 815. | 941. | $C_3H_7$ | F | H | H | H | CN |
| 564. | 690. | 816. | 942. | $C_3H_7$ | F | F | H | H | CN |
| 565. | 691. | 817. | 943. | $C_4H_9$ | H | H | H | H | CN |
| 566. | 692. | 818. | 944. | $C_4H_9$ | F | H | H | H | CN |
| 567. | 693. | 819. | 945. | $C_4H_9$ | F | F | H | H | CN |
| 568. | 694. | 820. | 946. | $C_5H_{11}$ | H | H | H | H | CN |
| 569. | 695. | 821. | 947. | $C_5H_{11}$ | F | H | H | H | CN |
| 570. | 696. | 822. | 948. | $C_5H_{11}$ | F | F | H | H | CN |
| 571. | 697. | 823. | 949. | $C_6H_{13}$ | H | H | H | H | CN |

-continued

Examples 506-630

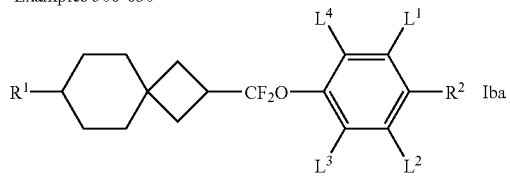     Iba

Examples 631-756

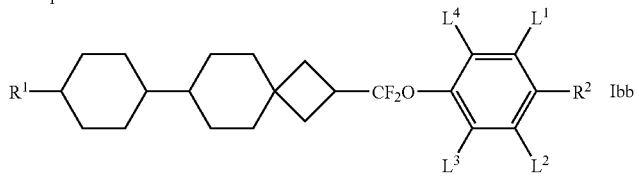     Ibb

Examples 757-882

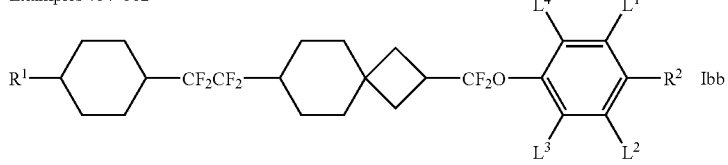     Ibb

Examples 883-1008

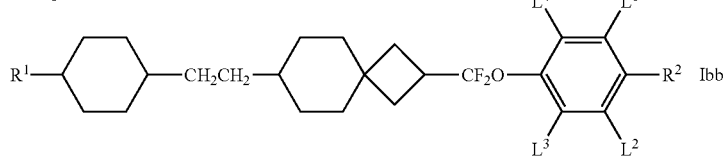     Ibb

| Examples | | | | $R^1$ | $L^1$ | $L^2$ | $L^3$ | $L^4$ | $R^2$ |
|---|---|---|---|---|---|---|---|---|---|
| 572. | 698. | 824. | 950. | $C_6H_{13}$ | F | H | H | H | CN |
| 573. | 699. | 825. | 951. | $C_6H_{13}$ | F | F | H | H | CN |
| 574. | 700. | 826. | 952. | $C_7H_{15}$ | H | H | H | H | CN |
| 575. | 701. | 827. | 953. | $C_7H_{15}$ | F | H | H | H | CN |
| 576. | 702. | 828. | 954. | $C_7H_{15}$ | F | F | H | H | CN |
| 577. | 703. | 829. | 955. | $C_2H_5$ | H | H | H | H | NCS |
| 578. | 704. | 830. | 956. | $C_2H_5$ | F | H | H | H | NCS |
| 579. | 705. | 831. | 957. | $C_2H_5$ | F | F | H | H | NCS |
| 580. | 706. | 832. | 958. | $C_3H_7$ | H | H | H | H | NCS |
| 581. | 707. | 833. | 959. | $C_3H_7$ | F | H | H | H | NCS |
| 582. | 708. | 834. | 960. | $C_3H_7$ | F | F | H | H | NCS |
| 583. | 709. | 835. | 961. | $C_4H_9$ | H | H | H | H | NCS |
| 584. | 710. | 836. | 962. | $C_4H_9$ | F | H | H | H | NCS |
| 585. | 711. | 837. | 963. | $C_4H_9$ | F | F | H | H | NCS |
| 586. | 712. | 838. | 964. | $C_5H_{11}$ | H | H | H | H | NCS |
| 587. | 713. | 839. | 965. | $C_5H_{11}$ | F | H | H | H | NCS |
| 588. | 714. | 840. | 966. | $C_5H_{11}$ | F | F | H | H | NCS |
| 589. | 715. | 841. | 967. | $C_6H_{13}$ | H | H | H | H | NCS |
| 590. | 716. | 842. | 968. | $C_6H_{13}$ | F | H | H | H | NCS |
| 591. | 717. | 843. | 969. | $C_6H_{13}$ | F | F | H | H | NCS |
| 592. | 718. | 844. | 970. | $C_7H_{15}$ | H | H | H | H | NCS |
| 593. | 719. | 845. | 971. | $C_7H_{15}$ | F | H | H | H | NCS |
| 594. | 720. | 846. | 972. | $C_7H_{15}$ | F | F | H | H | NCS |
| 595. | 721. | 847. | 973. | $C_2H_5$ | H | H | H | H | $SF_5$ |
| 596. | 722. | 848. | 974. | $C_2H_5$ | F | H | H | H | $SF_5$ |
| 597. | 723. | 849. | 975. | $C_2H_5$ | F | F | H | H | $SF_5$ |
| 598. | 724. | 850. | 976. | $C_3H_7$ | H | H | H | H | $SF_5$ |
| 599. | 725. | 851. | 977. | $C_3H_7$ | F | H | H | H | $SF_5$ |
| 600. | 726. | 852. | 978. | $C_3H_7$ | F | F | H | H | $SF_5$ |
| 601. | 727. | 853. | 979. | $C_4H_9$ | H | H | H | H | $SF_5$ |
| 602. | 728. | 854. | 980. | $C_4H_9$ | F | H | H | H | $SF_5$ |
| 603. | 729. | 855. | 981. | $C_4H_9$ | F | F | H | H | $SF_5$ |
| 604. | 730. | 856. | 982. | $C_5H_{11}$ | H | H | H | H | $SF_5$ |
| 605. | 731. | 857. | 983. | $C_5H_{11}$ | F | H | H | H | $SF_5$ |
| 606. | 732. | 858. | 984. | $C_5H_{11}$ | F | F | H | H | $SF_5$ |
| 607. | 733. | 859. | 985. | $C_6H_{13}$ | H | H | H | H | $SF_5$ |
| 608. | 734. | 860. | 986. | $C_6H_{13}$ | F | H | H | H | $SF_5$ |
| 609. | 735. | 861. | 987. | $C_6H_{13}$ | F | F | H | H | $SF_5$ |

-continued

Examples 506-630
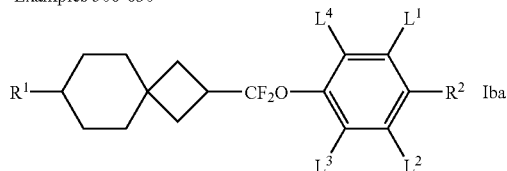
Iba

Examples 631-756
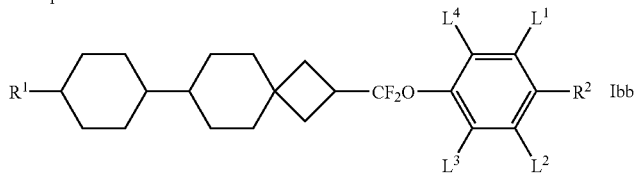
Ibb

Examples 757-882
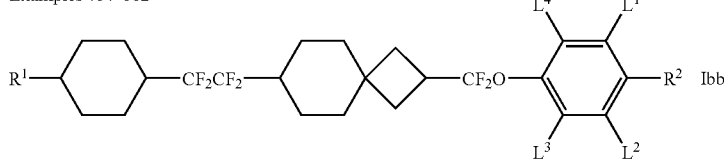
Ibb

Examples 883-1008
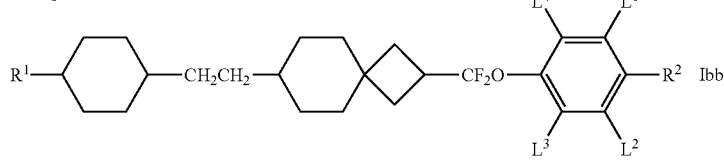
Ibb

| Examples | | | R¹ | L¹ | L² | L³ | L⁴ | R² |
|---|---|---|---|---|---|---|---|---|
| 610. | 736. | 862. | 988. | $C_7H_{15}$ | H | H | H | H | $SF_5$ |
| 611. | 737. | 863. | 989. | $C_7H_{15}$ | F | H | H | H | $SF_5$ |
| 612. | 738. | 864. | 990. | $C_7H_{15}$ | F | F | H | H | $SF_5$ |
| 613. | 739. | 865. | 991. | $C_2H_5$ | H | H | H | H | $OC_2H_5$ |
| 614. | 740. | 866. | 992. | $C_2H_5$ | F | H | H | H | $OC_2H_5$ |
| 615. | 741. | 867. | 993. | $C_2H_5$ | F | H | F | H | $OC_2H_5$ |
| 616. | 742. | 868. | 994. | $C_3H_7$ | H | H | H | H | $OC_2H_5$ |
| 617. | 743. | 869. | 995. | $C_3H_7$ | F | H | H | H | $OC_2H_5$ |
| 618. | 744. | 870. | 996. | $C_3H_7$ | F | H | F | H | $OC_2H_5$ |
| 619. | 745. | 871. | 997. | $C_4H_9$ | H | H | H | H | $OC_2H_5$ |
| 620. | 746. | 872. | 998. | $C_4H_9$ | F | H | H | H | $OC_2H_5$ |
| 621. | 747. | 873. | 999. | $C_4H_9$ | F | H | F | H | $OC_2H_5$ |
| 622. | 748. | 874. | 1000. | $C_5H_{11}$ | H | H | H | H | $OC_2H_5$ |
| 623. | 749. | 875. | 1001. | $C_5H_{11}$ | F | H | H | H | $OC_2H_5$ |
| 624. | 750. | 876. | 1002. | $C_5H_{11}$ | F | H | F | H | $OC_2H_5$ |
| 625. | 751. | 877. | 1003. | $C_6H_{13}$ | H | H | H | H | $OC_2H_5$ |
| 626. | 752. | 878. | 1004. | $C_6H_{13}$ | F | H | H | H | $OC_2H_5$ |
| 627. | 753. | 879. | 1005. | $C_6H_{13}$ | F | H | F | H | $OC_2H_5$ |
| 628. | 754. | 880. | 1006. | $C_7H_{15}$ | H | H | H | H | $OC_2H_5$ |
| 629. | 755. | 881. | 1007. | $C_7H_{15}$ | F | H | H | H | $OC_2H_5$ |
| 630. | 756. | 882. | 1008. | $C_7H_{15}$ | F | H | F | H | $OC_2H_5$ |

EXAMPLE 1009

A liquid-crystal mixture comprising

| BCH-3F.F | 10.80% |
|---|---|
| BCH-5F.F | 9.00% |
| ECCP-3OCF$_3$ | 4.50% |
| ECCP-5OCF$_3$ | 4.50% |
| CBC-33F | 1.80% |
| CBC-53F | 1.80% |

-continued

| CBC-55F | 1.80% |
|---|---|
| PCH-5F | 9.00% |
| PCH-6F | 7.20% |
| PCH-7F | 5.40% |
| CCP-2OCF$_3$ | 7.20% |
| CCP-3OCF$_3$ | 10.80% |
| CCP-4OCF$_3$ | 6.30% |
| CCP-5OCF$_3$ | 9.90% |
| Compound of Example 1 | 10.00% |

EXAMPLE 1010

A liquid-crystal mixture comprising

| | |
|---|---|
| CCH-3O1 | 11.23% |
| CCH-3CF$_3$ | 6.42% |
| CCH-5O1 | 8.82% |
| CCP-2F.F.F | 8.02% |
| CCP-3F.F.F | 10.42% |
| CCP-5F.F.F | 4.01% |
| CCPC-33 | 2.41% |
| CCZU-2-F | 4.01% |
| CCZU-3-F | 13.62% |
| CCZU-5-F | 4.01% |
| CH-33 | 2.41% |
| CH-35 | 2.41% |
| CH-43 | 2.41% |
| Compound of Example 1 | 19.80% | has the following properties:
Clearing point: +72.0° C.
Δn: +0.0605

EXAMPLE 1011

A liquid-crystal mixture comprising

| | |
|---|---|
| BCH-3F.F | 10.76% |
| BCH-5F.F | 8.98% |
| ECCP-3OCF$_3$ | 4.49% |
| ECCP-5OCF$_3$ | 4.49% |
| CBC-33F | 1.80% |
| CBC-53F | 1.80% |
| CBC-55F | 1.80% |
| PCH-6F | 7.18% |
| PCH-7F | 5.39% |
| CCP-2OCF$_3$ | 7.18% |
| CCP-3OCF$_3$ | 10.76% |
| CCP-4OCF$_3$ | 6.28% |
| CCP-5OCF$_3$ | 9.87% |
| PCH-5F | 8.98% |
| Compound of Example 505 | 10.24% | has the following properties:
Clearing point: +73.2° C.
Δε: +5.3
Δn: +0.0885

The invention claimed is:
1. Cyclobutane derivatives of the formula I

I in which
R$^1$, R$^2$ are identical or different and each, independently of one another, denote H, halogen (F, Cl, Br or I) or a linear or branched, optionally chiral alkyl or alkoxy radical having 1 to 15 C atoms which is unsubstituted or mono- or polysubstituted by halogen and in which one or more CH$_2$ groups may each be replaced, independently of one another, by —O—, —S—, —CO—, —CO—O—, —O—CO—, —O—CO—O—, —CH=CH—, —CH=CF—, —CF=CF—, —C≡C— or

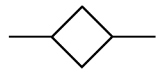

in such a way that heteroatoms are not linked directly to one another, —CN, —SCN, —SF$_5$, —SCF$_3$, —CF$_3$, —CF=CF$_2$, —CF$_2$CF$_2$CF$_3$, —OCF$_3$, —OCHF$_2$, —CF$_2$CH$_2$CF$_3$ or —OCH$_2$CF$_2$CHFCF$_3$, A is identical or different and in each case, independently of one another, denotes
 a) trans-1,4-cyclohexylene, in which, in addition, one or more non-adjacent CH$_2$ groups may be replaced by —O— and/or —S— and in which, in addition, one or more H atoms may be replaced by F,
 b) 1,4-phenylene, in which one or two CH groups may be replaced by N and in which, in addition, one or more H atoms may be replaced by halogen (F, Cl, Br or I), —CN, —CH$_3$, —CHF$_2$, —CH$_2$F, —OCH$_3$, —OCHF$_2$ or —OCF$_3$,
 c) a radical from the group bicyclo[1.1.1]pentane-1,3-diyl, bicyclo[2.2.2]octane-1,4-diyl, spiro[3.3]heptane-2,6-diyl, naphthalene-2,6-diyl, decahydronaphthalene-2,6-diyl, 1,2,3,4-tetrahydronaphthalene-2,6-diyl and piperidine-1,4-diyl, or
 d) 1,4-cyclohexenylene, Z is identical or different and in each case, independently of one another, denotes —O—, —CH$_2$O—, —OCH$_2$—, —CO—O—, —O—CO—, —CF$_2$O—, —OCF$_2$—, —CF$_2$CF$_2$—, —CH$_2$CF$_2$—, —CF$_2$CH$_2$—, —CH$_2$CH$_2$—, —CH=CH—, —CH=CF—, —CF=CH—, —CF=CF—, —CF=CF—COO—, —O—CO—CF=CF—, —C≡C— or a single bond, m, n are identical or different and, independently of one another, denote 0, 1 or 2, and
o denotes 0 or 1.

2. Compounds according to claim 1, wherein both o denote 0.

3. Compounds according to claim 1, wherein both o denote 1.

4. Compounds according to claim 2, having one of the following formulae:

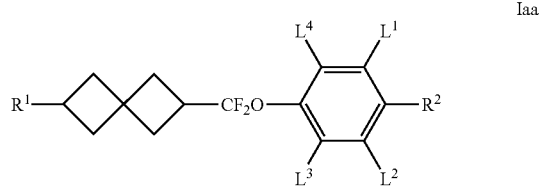

Iaa

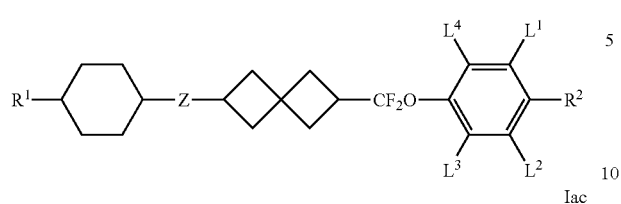
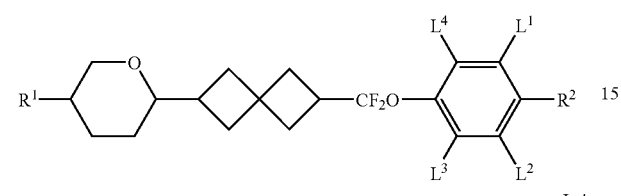
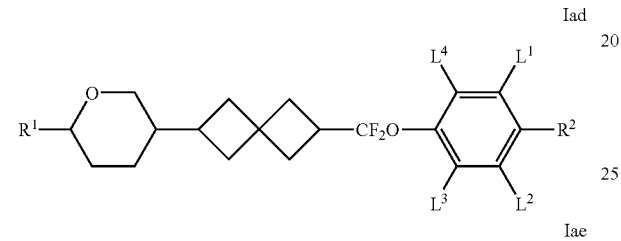
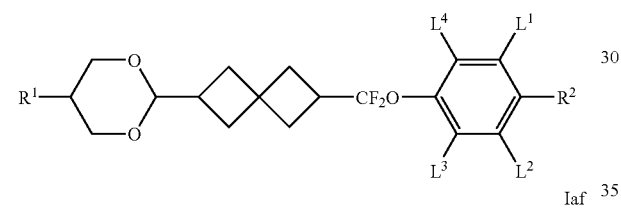
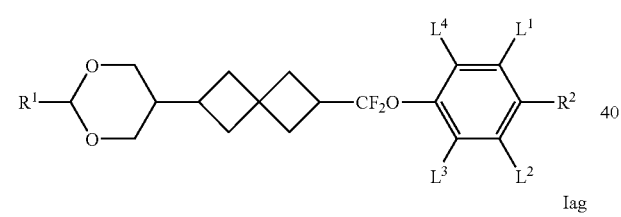
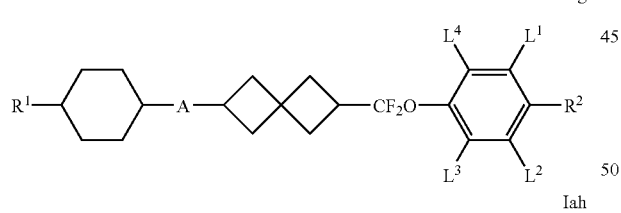
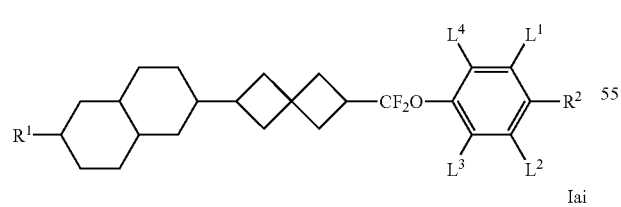
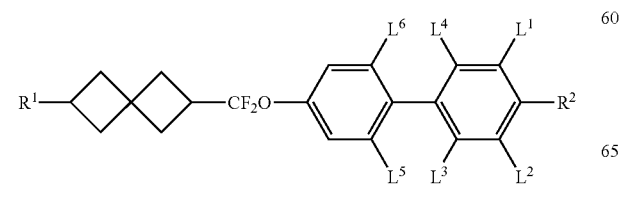
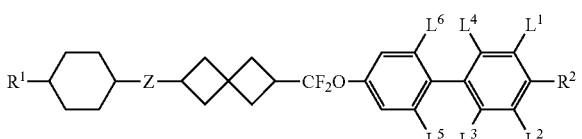
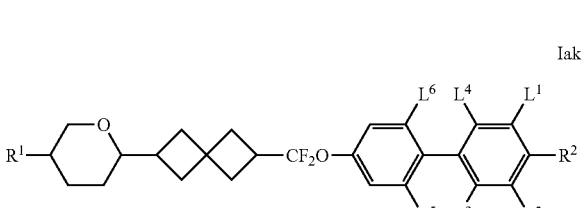
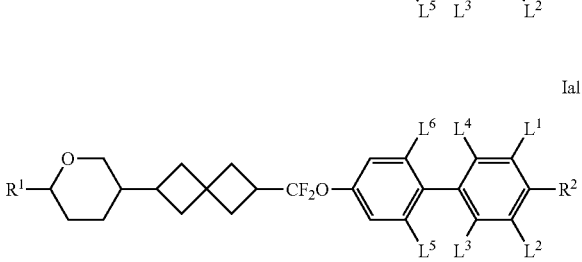
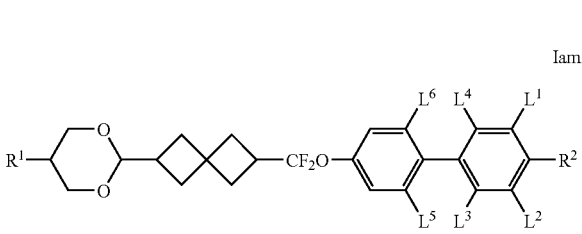
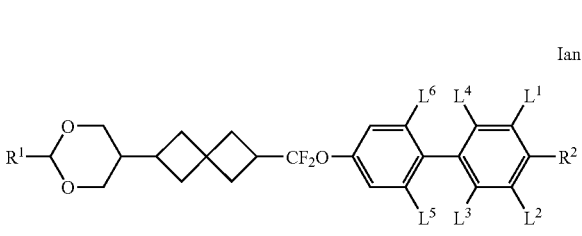
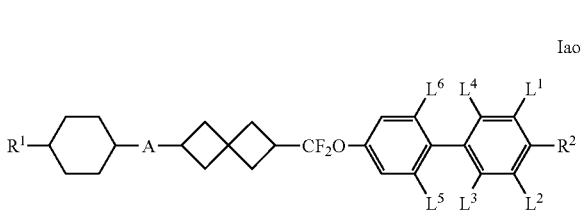
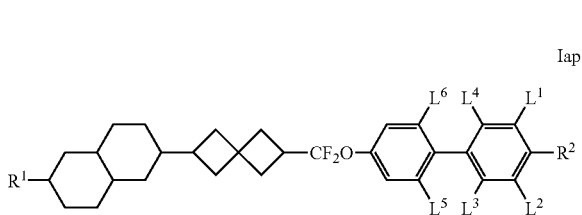
in which $L^1$, $L^2$, $L^3$, $L^4$, $L^5$ and $L^6$, are identical or different and, independently of one another, denote H or F.

5. Compounds according to claim 3, having one of the following formulae:
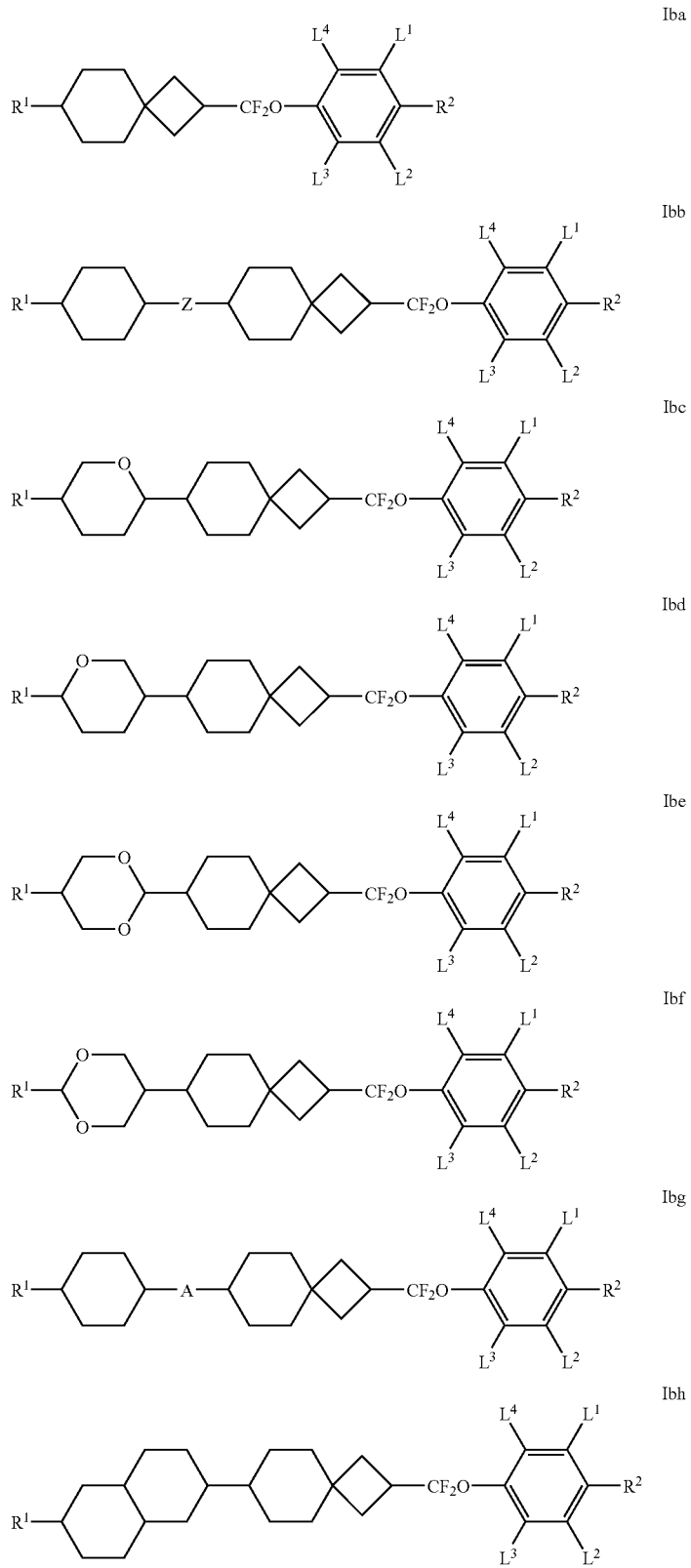

-continued
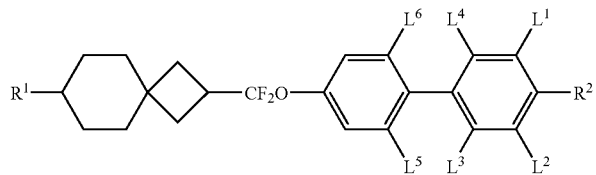
Ibi
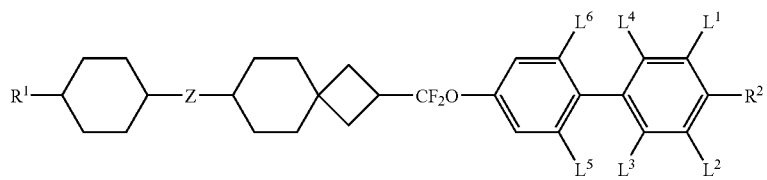
Ibj
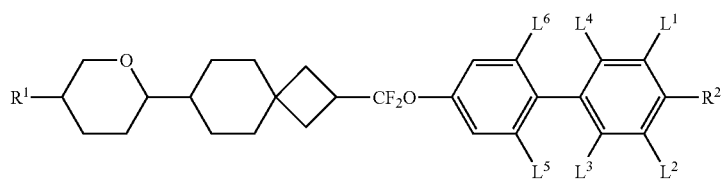
Ibk
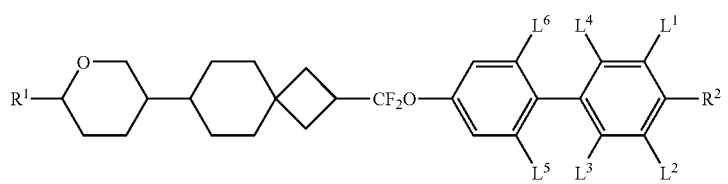
Ibl
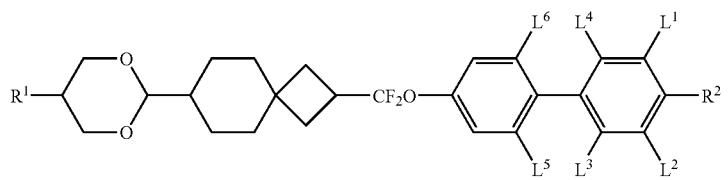
Ibm
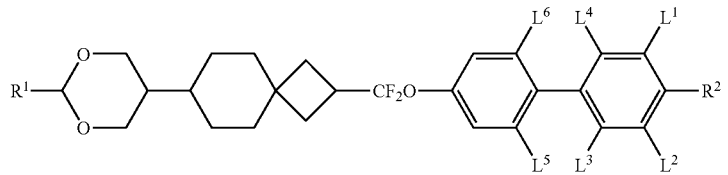
Ibn
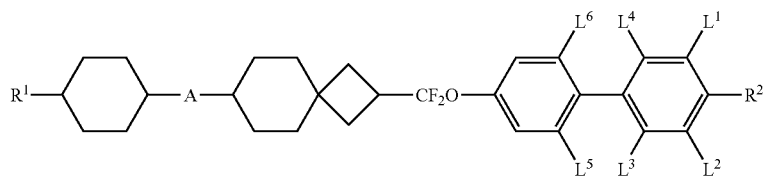
Ibo
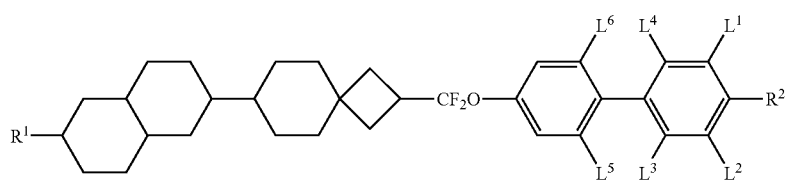
Ibp in which $L^1$, $L^2$, $L^3$, $L^4$, $L^5$ and $L^6$, are identical or different and, independently of one another, denote H or F.

6. Compounds according to at least claim 1, characterised in that $R^1$ denotes H or a linear alkyl radical having 1 to 10 C atoms.

7. Compounds according to claim 1, characterised in that $R^2$ denotes H, a linear alkoxy radical having 1 to 10 C atoms, —F, —Cl, —$CF_3$, —$OCF_3$, —$OCHF_2$, —CN, or —$SF_5$.

8. Liquid-crystalline medium having at least two liquid-crystalline components, wherein at least one componet comprises at least one compound of the formula I according to claim 1 wherein.

9. Liquid-crystal display element, containing a dielectric, which dielectric is a liquid-crystalline medium according to claim 8.

10. Reflective or transflective liquid-crystal display element, containing a dielectric, which dielectric is a liquid-crystalline medium according to claim 8.

11. Electro-optical display element, containing a dielectric, which dielectric is a liquid-crystalline medium according to claim 8.

* * * * *

UNITED STATES PATENT AND TRADEMARK OFFICE
CERTIFICATE OF CORRECTION

PATENT NO. : 7,270,856 B2  Page 1 of 1
APPLICATION NO. : 10/537026
DATED : September 18, 2007
INVENTOR(S) : Andreas Taugerbeck It is certified that error appears in the above-identified patent and that said Letters Patent is hereby corrected as shown below:

Column 53, line 3, reads "to at least claim" should read -- to claim --
Column 53, line 10, reads "one componet" should read -- one component --
Column 53, line 12, reads "claim 1 wherein." should read -- claim 1. --
Column 54, line 1, reads "element, containing" should read -- element containing --

Signed and Sealed this

Sixth Day of January, 2009

JON W. DUDAS
*Director of the United States Patent and Trademark Office*